Dec. 30, 1941.   A. C. HIRSCH ET AL   2,268,334
METHOD OF MANUFACTURING TIRES
Original Filed Nov. 4, 1937   16 Sheets-Sheet 1

INVENTORS
A.C.HIRSCH, J.F.CULLEN,
A.R.KRAUSE & H.O.HUTCHENS
BY
*Touley and Budlong*
ATTORNEYS

A.C. HIRSCH,
J.F. CULLEN,
A.R. KRAUSE
& H.O. HUTCHENS

INVENTORS

Dec. 30, 1941.   A. C. HIRSCH ET AL   2,268,334
METHOD OF MANUFACTURING TIRES
Original Filed Nov. 4, 1937   16 Sheets-Sheet 5
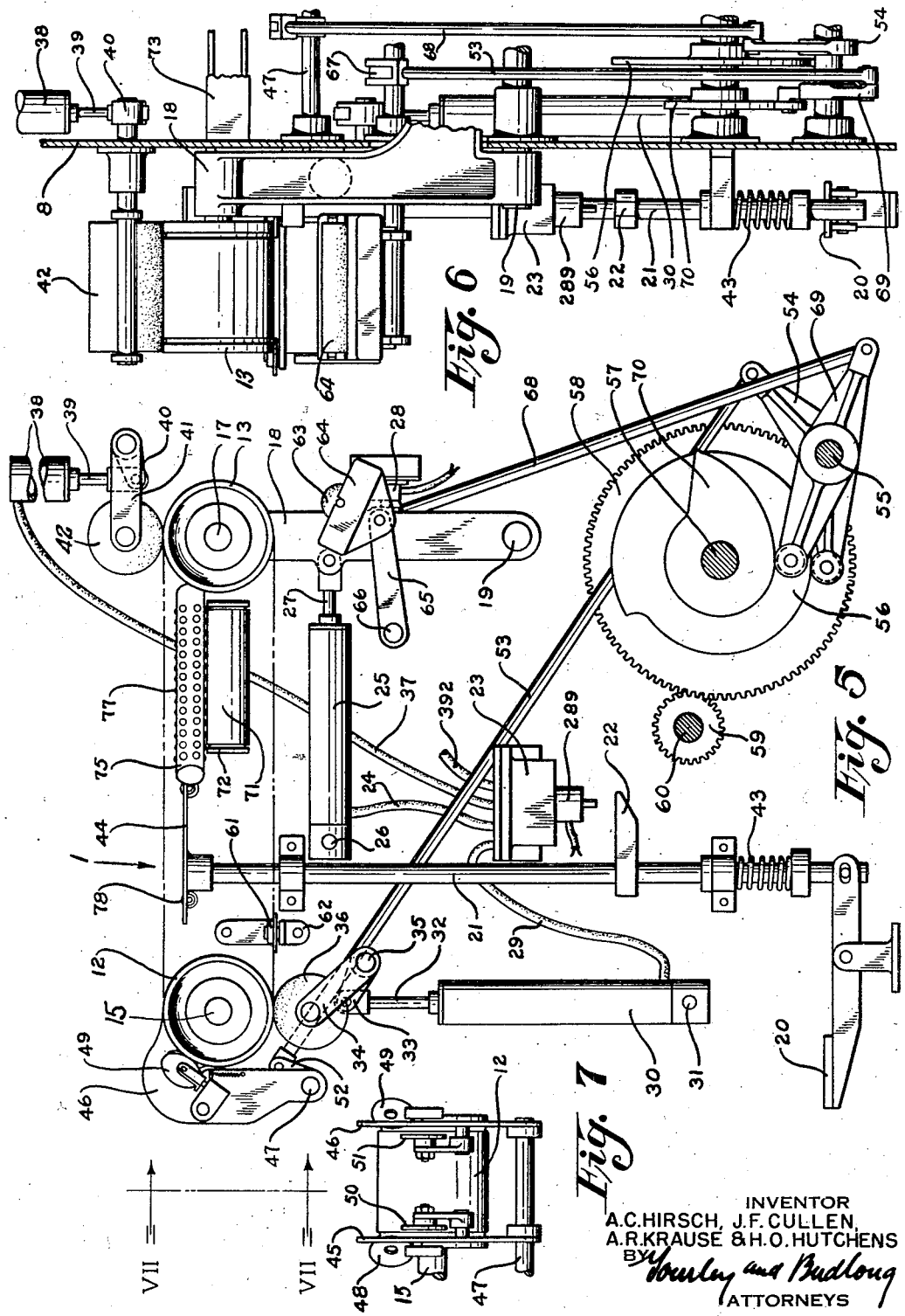
INVENTOR
A.C.HIRSCH, J.F.CULLEN,
A.R.KRAUSE & H.O.HUTCHENS
ATTORNEYS

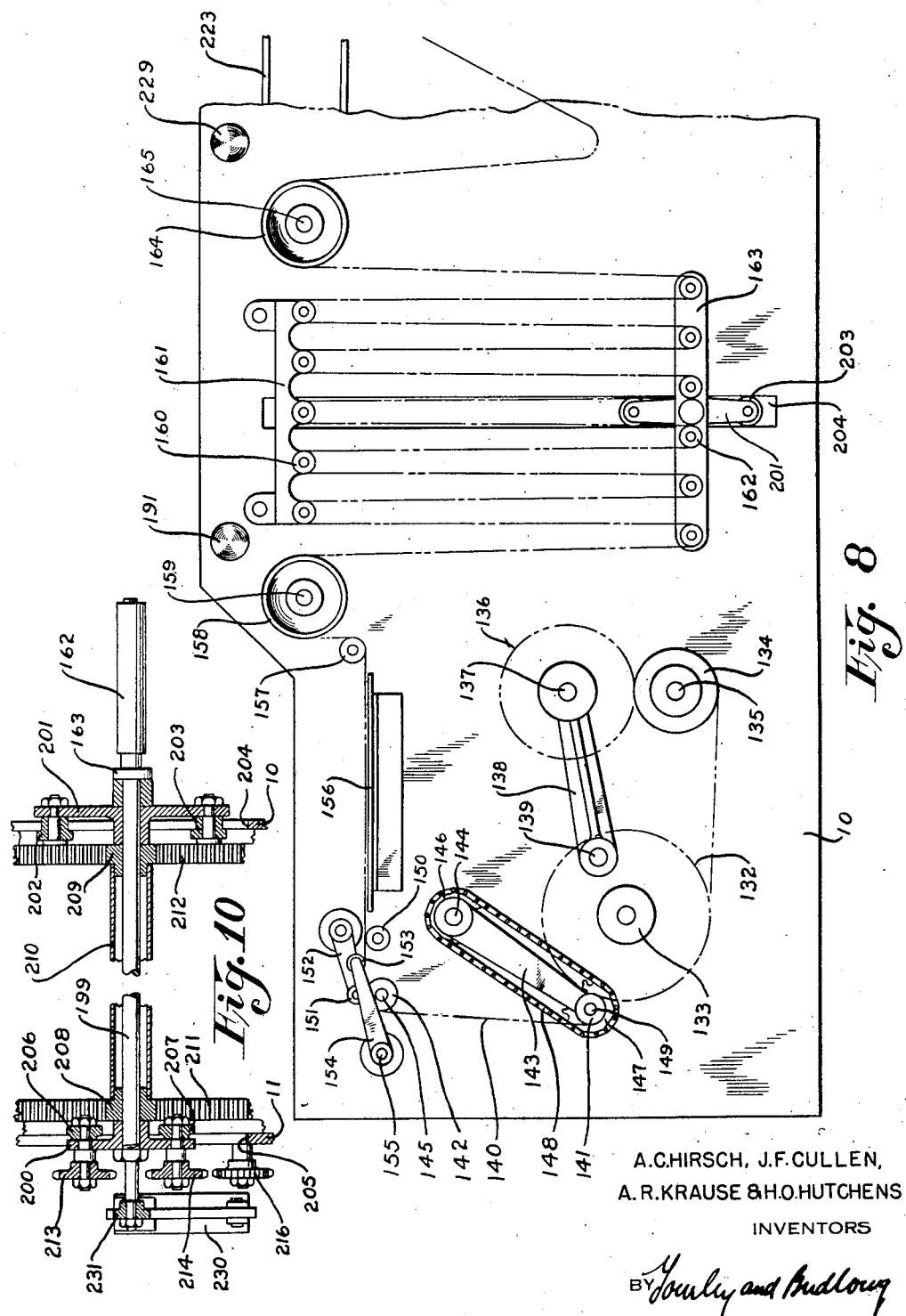

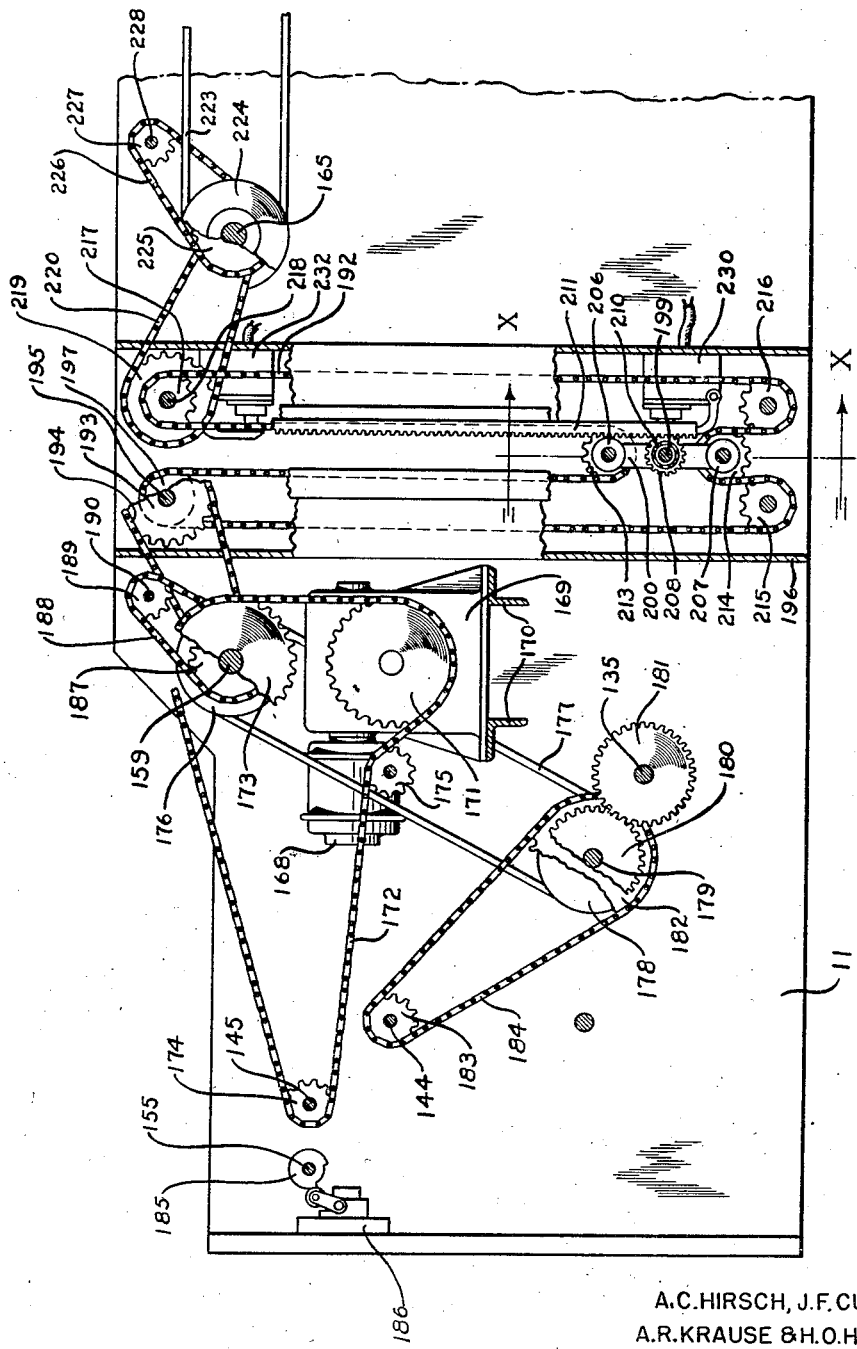

Dec. 30, 1941.    A. C. HIRSCH ET AL    2,268,334
METHOD OF MANUFACTURING TIRES
Original Filed Nov. 4, 1937    16 Sheets-Sheet 8
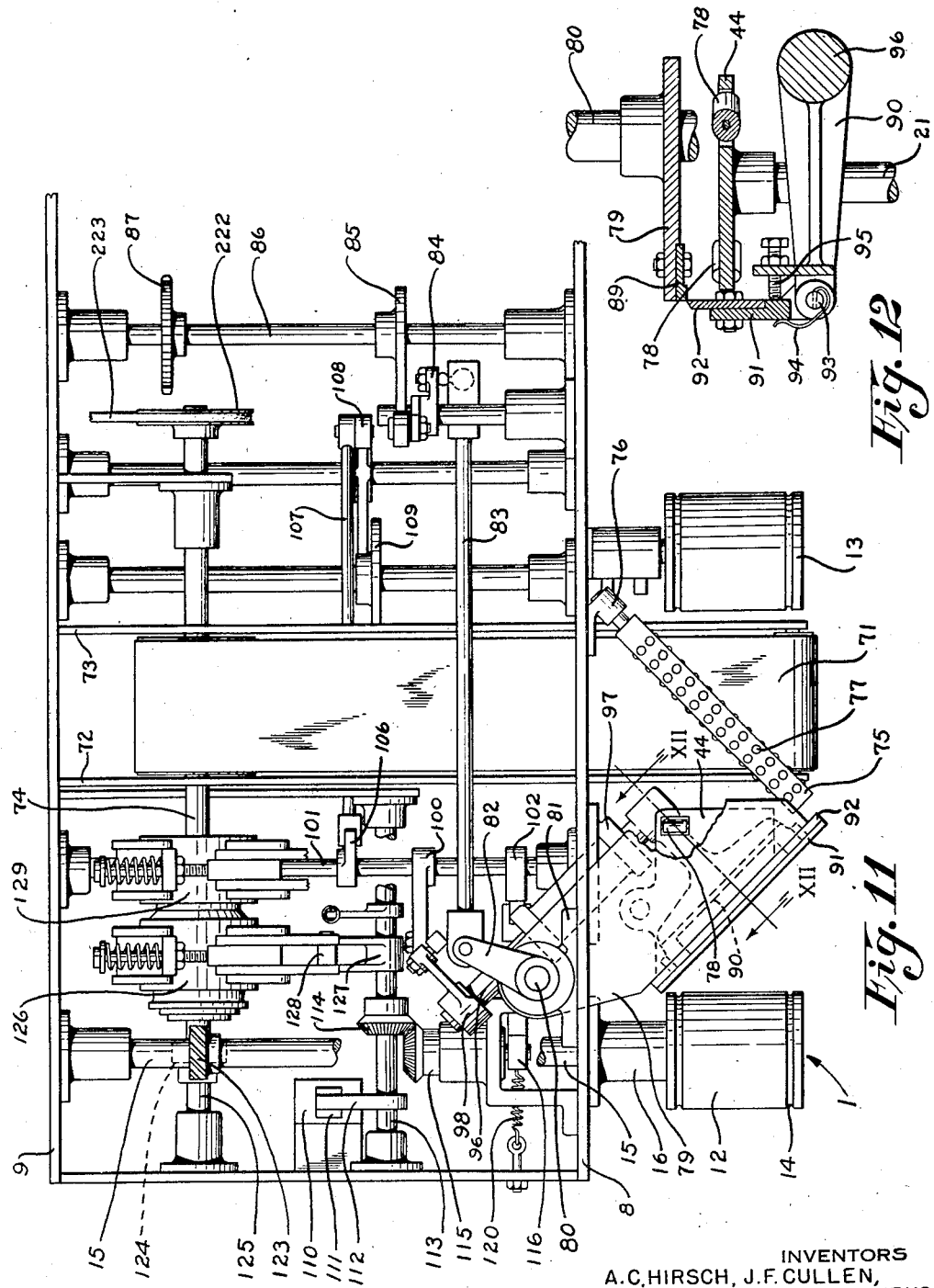
INVENTORS
A.C.HIRSCH, J.F.CULLEN,
A.R.KRAUSE & H.O.HUTCHENS
BY Jourly and Budlong
ATTORNEYS

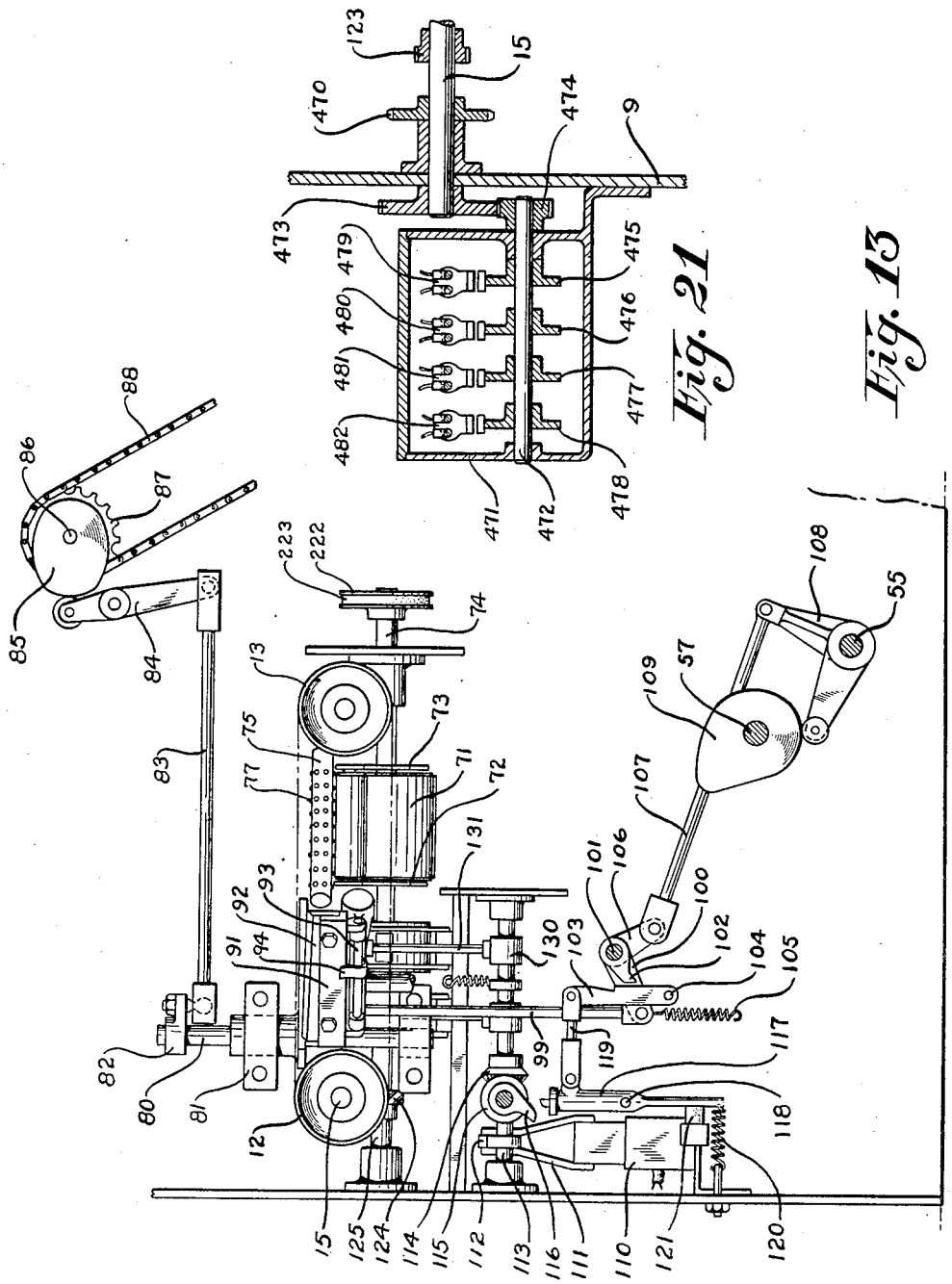

Dec. 30, 1941.   A. C. HIRSCH ET AL   2,268,334
METHOD OF MANUFACTURING TIRES
Original Filed Nov. 4, 1937   16 Sheets-Sheet 10
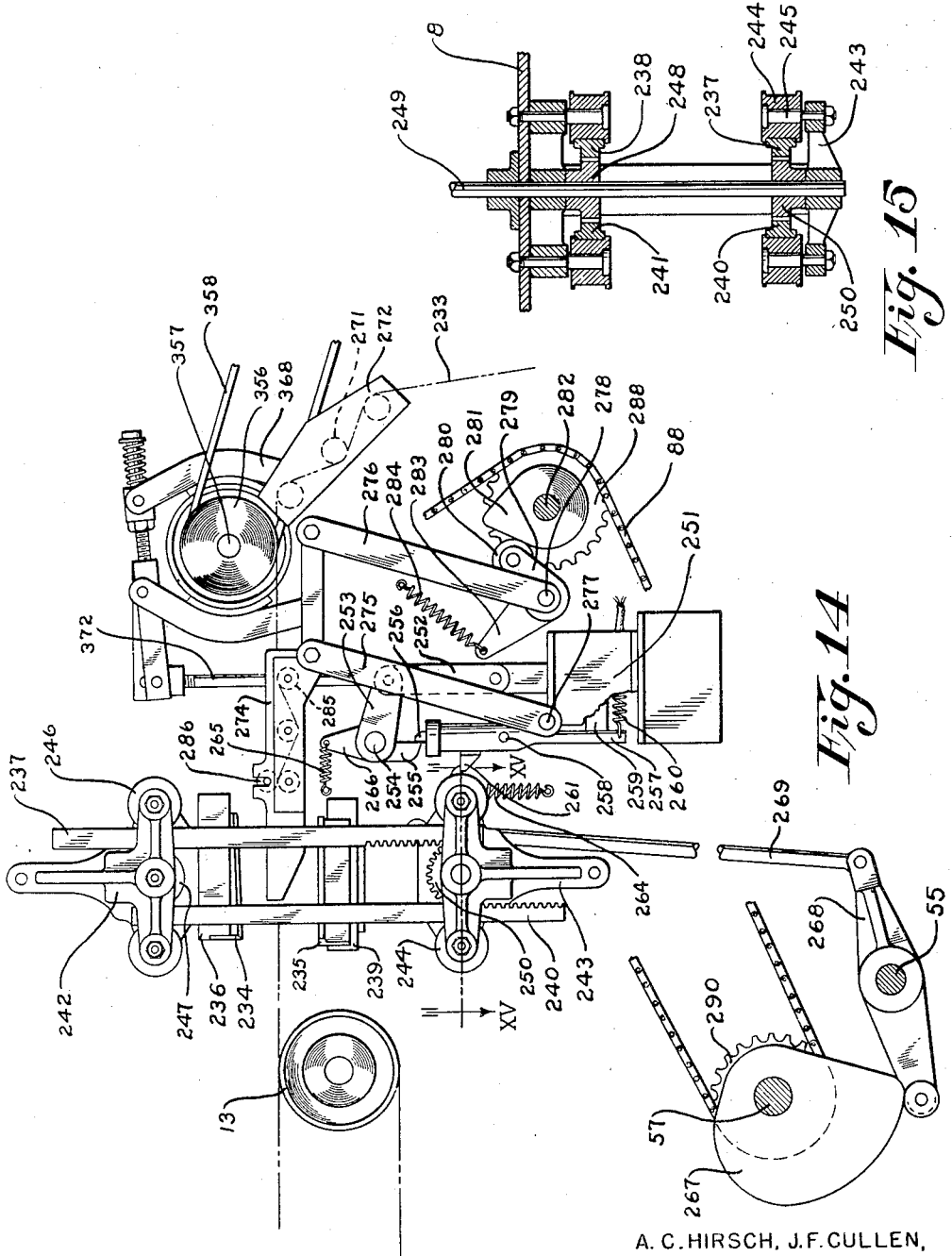
A.C.HIRSCH, J.F.CULLEN,
A.R.KRAUSE & H.O.HUTCHENS
INVENTORS
ATTORNEYS

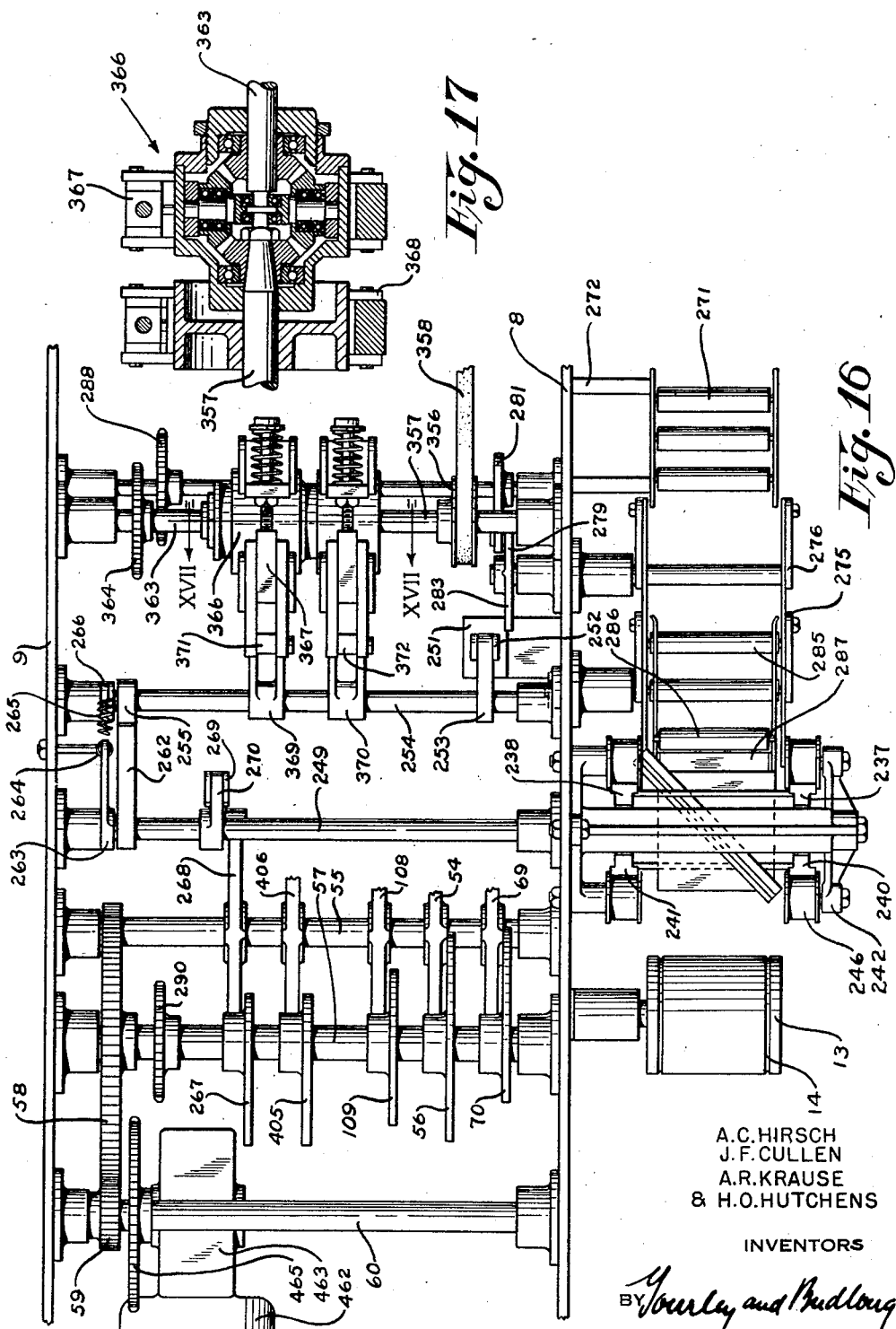

Dec. 30, 1941.   A. C. HIRSCH ET AL   2,268,334
METHOD OF MANUFACTURING TIRES
Original Filed Nov. 4, 1937   16 Sheets-Sheet 12
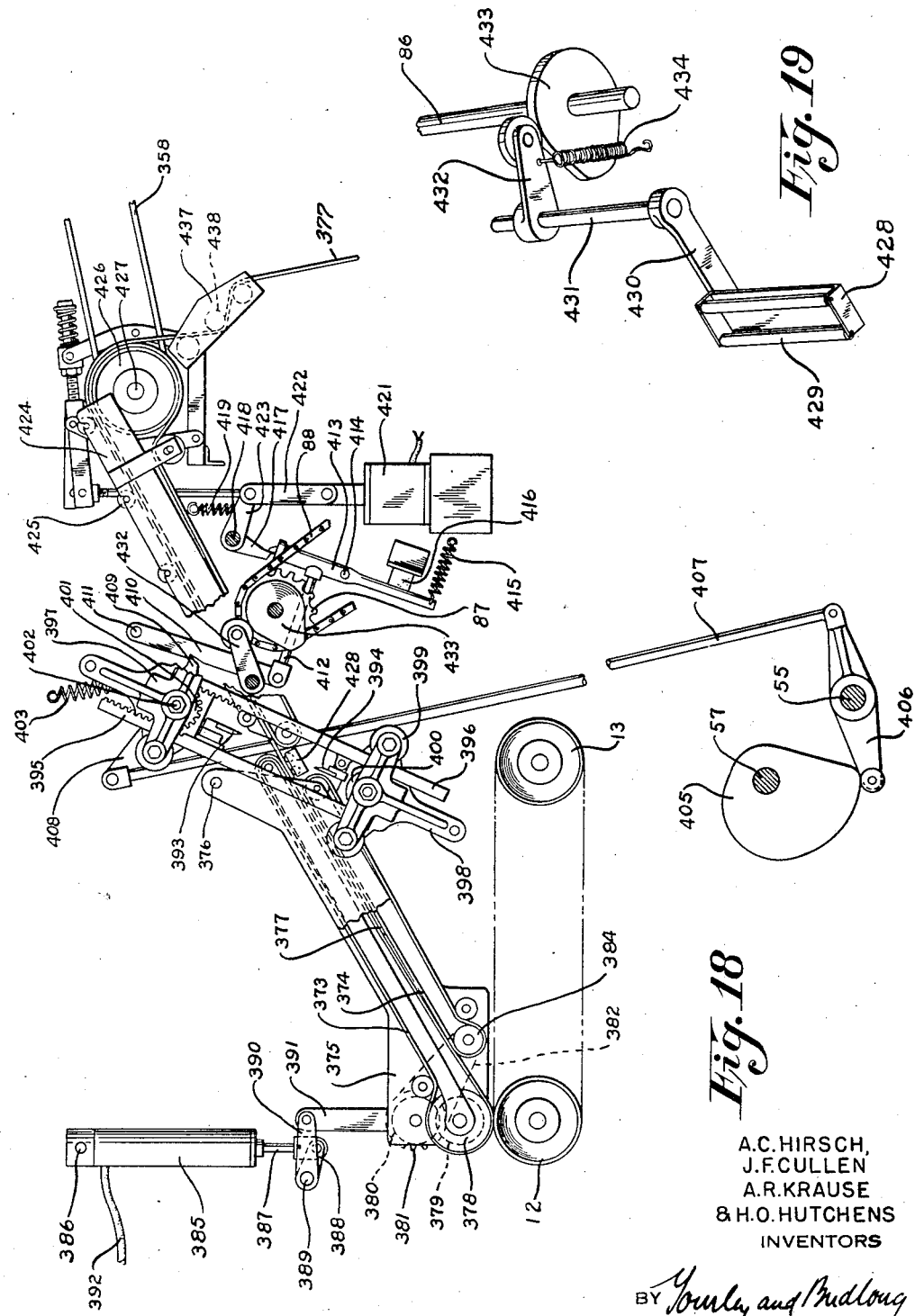
A.C. HIRSCH,
J.F. CULLEN
A.R. KRAUSE
& H.O. HUTCHENS
INVENTORS
BY *Younley and Budlong*
ATTORNEYS

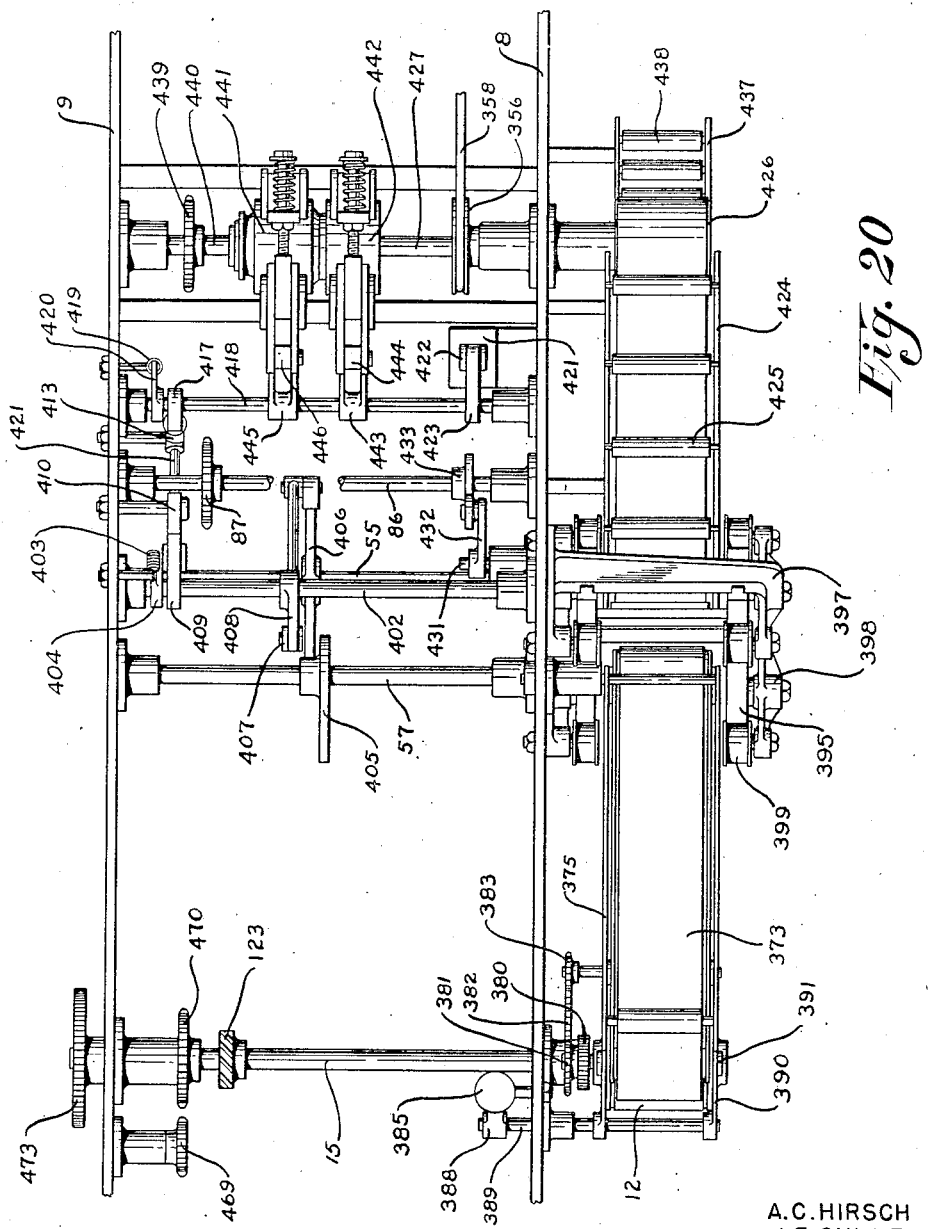

Dec. 30, 1941.   A. C. HIRSCH ET AL   2,268,334
METHOD OF MANUFACTURING TIRES
Original Filed Nov. 4, 1937   16 Sheets-Sheet 14

A.C. HIRSCH
J.F. CULLEN
A.R. KRAUSE
& H.O. HUTCHENS
INVENTORS

BY *Touslay and Budlong*
ATTORNEYS

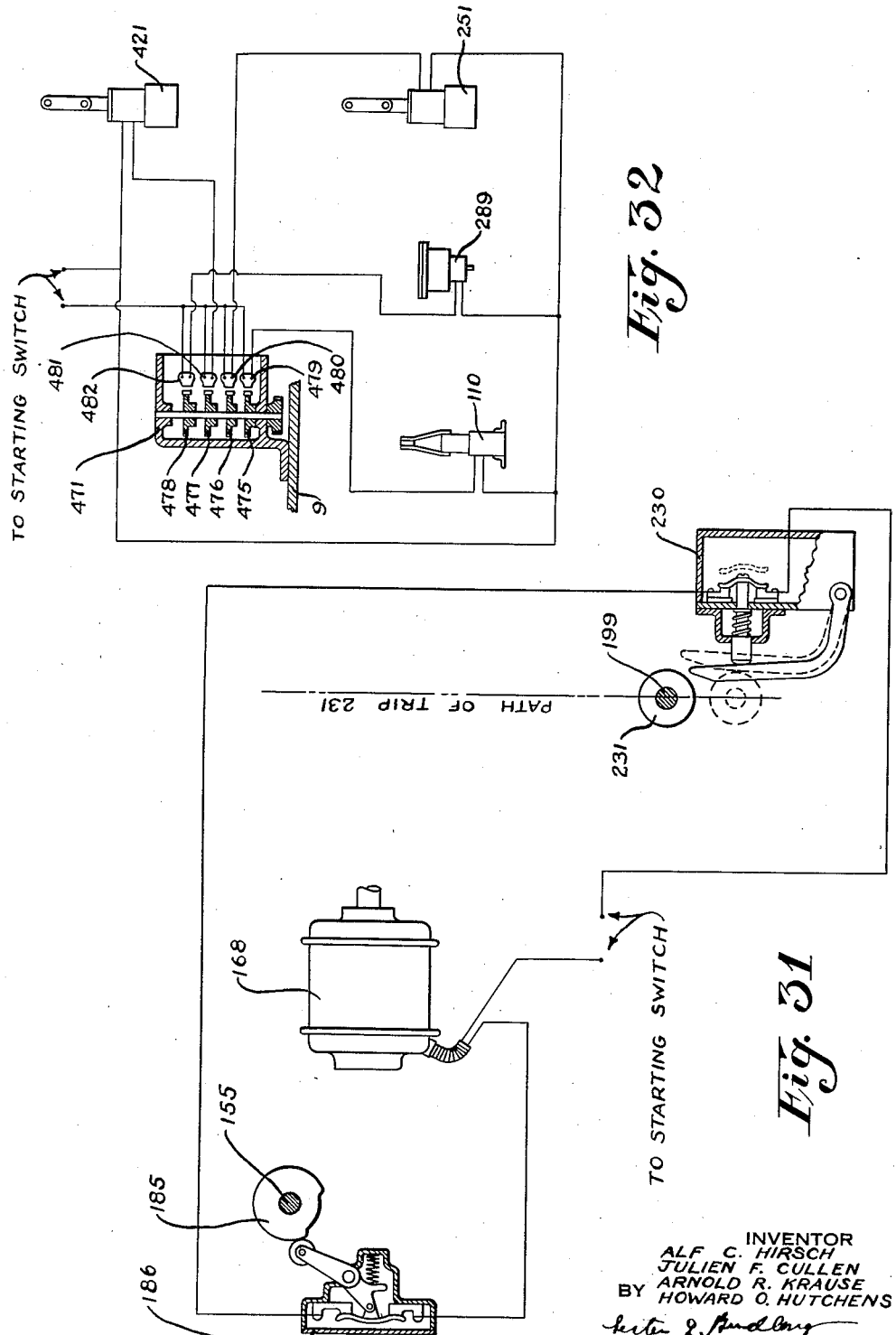

Patented Dec. 30, 1941

2,268,334

UNITED STATES PATENT OFFICE 2,268,334

METHOD OF MANUFACTURING TIRES

Alf C. Hirsch, Julien F. Cullen, Arnold R. Krause. and Howard O. Hutchens, Eau Claire, Wis., assignors, by mesne assignments, to United States Rubber Company, New York, N. Y., a corporation of New Jersey Original application November 4, 1937, Serial No. 172,710. Divided and this application December 17, 1938, Serial No. 246,480

10 Claims. (Cl. 154—14)

This invention relates to pneumatic tires, and in particular it relates to a method for automatically assembling the various elements of pneumatic tires, being a division of application Serial No. 172,710, filed November 4, 1937. In general, the apparatus of the invention includes a tire building support comprising a pair of drums spaced apart and adapted to receive tire elements, and automatic means adapted to measure, cut, and supply the tire elements to the tire building support in proper sequence and without interruption of a tire building cycle.

Heretofore the assembly of tire components has been essentially a manual operation, and as such the operation required skilled labor. Associated with manual assembly of tire components is its attendant variation from uniformity and increased requirement of more rigid inspection. Among the objects of the present invention are, to overcome these objectionable conditions and in addition to provide increased efficiency in the manufacture of pneumatic tires; to provide increased tire production per unit area of floor space; to provide a method of assembling tire elements in which plies under the bead wires may be assembled independently of or simultaneously with the application of plies over the bead wires; to facilitate stock concentration; and to reduce errors attributed to manual operations.

These and other objects and advantages will appear more fully in the following detailed description, when considered in connection with the accompanying drawings, in which:

Fig. 5 is an elevational view of a tire building support and associated mechanism;

Fig. 6 is an end view thereof, partly in section;

Fig. 7 is an end view of one of the tire building supports, as viewed from line VII—VII of Fig. 5;

Fig. 8 is an enlarged side elevational view of a portion of the apparatus shown in Fig. 1, as viewed from line VIII—VIII;

Fig. 9 is an enlarged elevational view, in section, of the mechanism in back of the frame shown in Fig. 8, this section being taken along lines IX—IX of Fig. 1;

Fig. 10 is a side view, in section, of a festoon operating mechanism, taken along line X—X of Fig. 9;

Fig. 11 is a plan view, somewhat enlarged, of a portion of the view shown in Fig. 1, illustrating the tire building supports and cooperative mechanism associated with the supports;

Fig. 12 is an end view, in section, of a device for cutting the first ply fabric, taken along line XII—XII of Fig. 11;

Fig. 13 is a front elevational view of the mechanism shown in Fig. 11, with the frame plate removed;

Fig. 14 is a front elevational view of mechanism for feeding and cutting second ply fabric;

Fig. 15 is a plan view, in section, of cutter operating mechanism, taken along line XV—XV of Fig. 14;

Fig. 16 is a plan view of the mechanism shown in Fig. 14, and, further, is an enlarged plan view of a portion of the apparatus shown in Fig. 1;

Fig. 17 is a side view, in section, of control mechanism for operating the fabric feeding device, taken along line XVII—XVII of Fig. 16;

Fig. 18 is a front elevational view of mechanism for feeding and cutting tread stock;

Fig. 19 is a perspective view of mechanism for guiding tread stock after the cutting operation;

Fig. 20 is a plan view of the tread mechanism shown in Fig. 18;

Fig. 21 is an enlarged side view, in section, of timing mechanism, taken along line XXI—XXI of Fig. 1;

Figure 1:
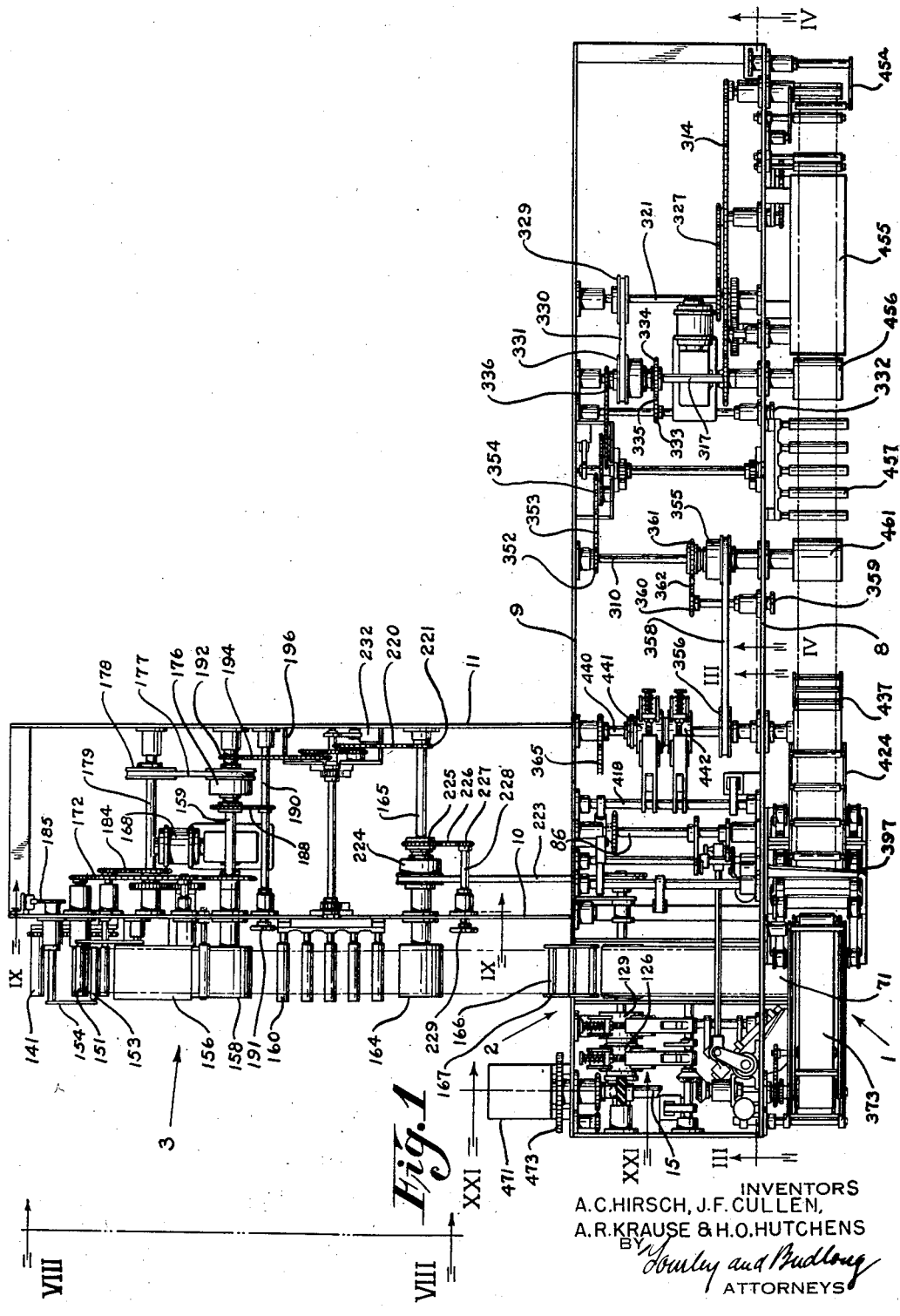
Fig. 1 is a plan view of an apparatus embodying features of our invention.

Figs. 22 to 30, inclusive, illustrate various steps in the method of manipulating the tire components on the building supports;

Fig. 31 is a wiring diagram illustrating an electrical control of ply feeding devices; and, Fig. 32 is a wiring diagram illustrating electrical connections between the principal switches and solenoids of the apparatus.

While we have shown an apparatus designed particularly for building a two-play pneumatic tire, it is to be understood that the mechanism may be arranged for automatically assembling tires having more than two plies.

In certain of the views in the drawings, unrelated parts of the mechanisms have been omitted in order to illustrate more clearly the specific subject of the embodiment being described. It is to be understood, however, that it is intended that each view include all of the mechanism properly associated therewith as disclosed by the complete embodiment.

Figure 2:
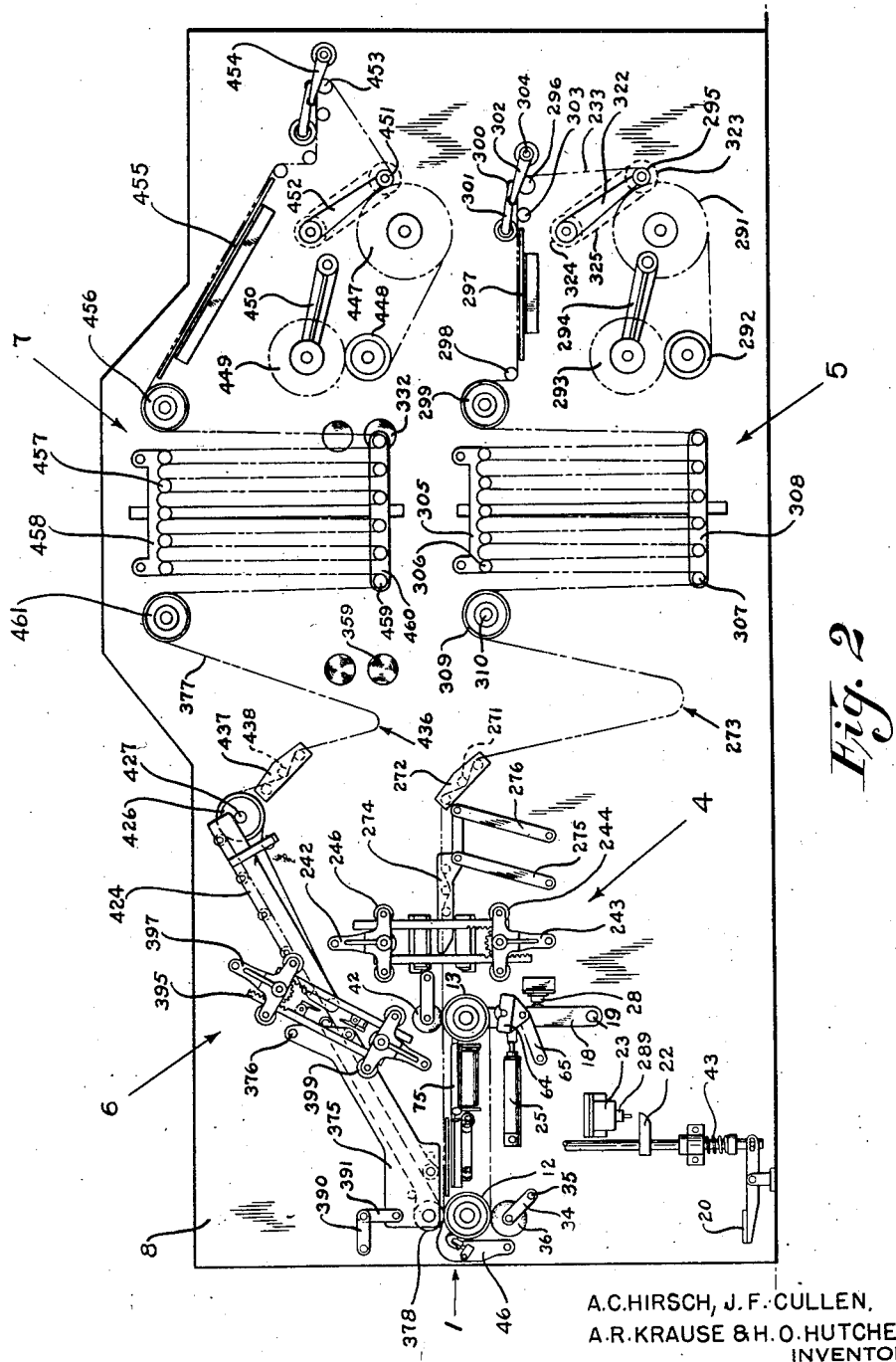
Fig. 2 is a front elevational view thereof.

With particular reference to Figs. 1 and 2 of the drawings, the apparatus may be divided into a number of units or stations, among which are a tire building support indicated by the reference character 1, first ply feeding and cutting mechanism 2, first ply supply mechanism 3, second ply feeding and cutting mechanism 4, second ply supply mechanism 5, tread feeding and cutting mechanism 6, and tread supply mechanism 7. The principal portions of the apparatus are supported by a front frame 8, a back frame 9, and side frames 10 and 11.

*Tire building support*

The tire building support 1 is shown in particular in Figs. 2, 5, and 11. Essentially, it comprises a driven drum 12 and an idler drum 13. Each of these drums is provided with grooves 14 (Fig. 11) for the purpose of positioning and spacing bead wires 483 forming component parts of pneumatic tires. The drum 12 is keyed to a shaft 15 rotatably mounted in a bearing 16 attached to the frame 8. The idler drum 13 is rotatably mounted on a shaft 17 secured to an arm 18 pivotally connected to frame 8 at 19. The drum 13 is positioned in spaced relation to drum 12, and in a manner to permit tire bead wires to be positioned in the grooves 14 in the drums.

Before the bead wires are applied to the tire building drum, the drum 13 is in its inoperative position; that is, the arm 18 is moved on its pivot to bring the drum 13 in closer relationship to the drum 12. In this position the bead wires may be easily positioned in the grooves of the drums 12 and 13. When this operation has been completed, the operator presses a foot pedal 20 (Fig. 5) connected to a vertical shaft 21. As the pedal 20 is moved downwardly, shaft 21 is moved upwardly, carrying with it a bracket 22 which is engageable with a pneumatic valve 23. A conduit 24 connects with the valve 23 and joins with a pneumatic cylinder 25 pivotally mounted to the frame 8 at 26, and having a piston rod 27 therein which is connected to the arm 18 for supporting the drum 13. Upon actuation of the valve 23 by the upward movement of the bracket 22, the pneumatic cylinder 25 is operated, causing the arm 18 to swing on its pivot and provide tension to the bead wires mounted in the grooves 14 of the tire building drums 12 and 13. As the arm 18 reaches its outward position it engages with an electric switch 28 for starting the operation of the apparatus as more particularly described hereinafter.

As the valve mechanism 23 is actuated, stitching devices are simultaneously moved into engagement with the drums 12 and 13. A conduit 29 connects the valve mechanism 23 with a pneumatic cylinder 30 pivotally attached to the frame 8 at 31. A piston rod 32, through arms 33 and 34 pivotally attached to the frame at 35, supports a stitching roller 36. The stitching roller 36 is of resilient composition, such as rubber, and is adapted to press firmly against the under side of the building drum 12 upon actuation of the pneumatic cylinder 30. In a somewhat similar manner, a conduit 37 connects with a cylinder 38 which, through piston rod 39 and arms 40 and 41, functions to press a stitching roller 42 against the upper side of the building drum 13.

The pneumatic cylinders 25, 30, and 38, of conventional type, are single acting cylinders; that is, fluid under pressure is utilized to move the piston rod to an outward position, while a spring (not shown) within the cylinder causes the piston rod to recede upon release of fluid pressure by timing devices hereinafter described. When the valve mechanism 23 is actuated by the bracket 22, it continues to supply fluid under pressure to the various pneumatic cylinders until it is reactuated by a solenoid 289 controlled by a timing mechanism.

A spring 43 maintains the foot pedal 20 and the vertical shaft 21 in their normal, inoperative position.

A plate 44 is mounted at the upper end of the vertical shaft 21, and functions to move the fabric of the first ply into engagement with the under side of the bead wires described hereinafter in connection with the application of the first ply to the tire building drums.

Figure 25:
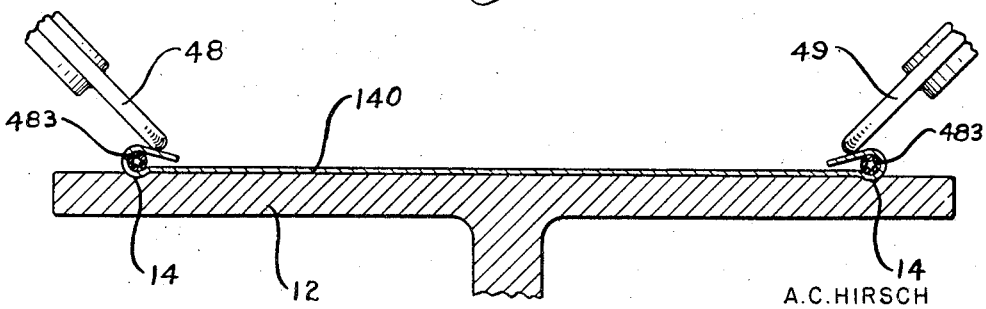
Figure 26:
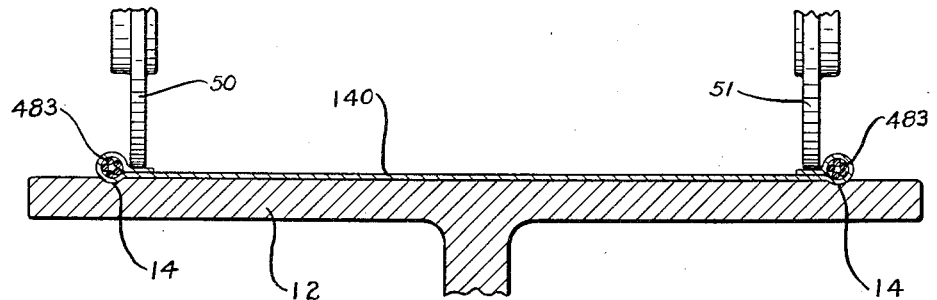
Figure 27:
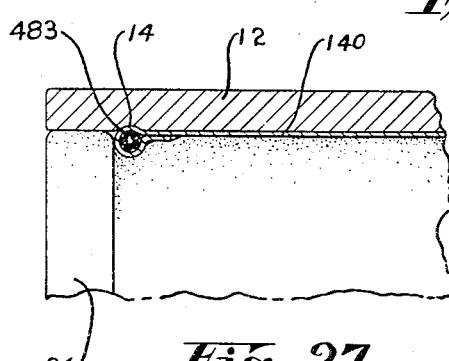
Figure 28:
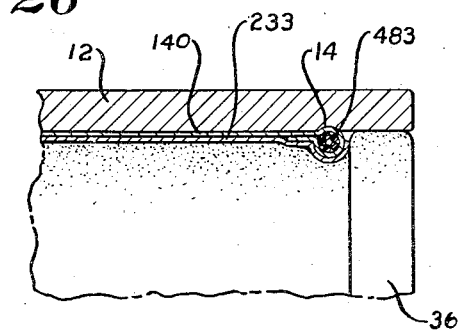
Figure 29:
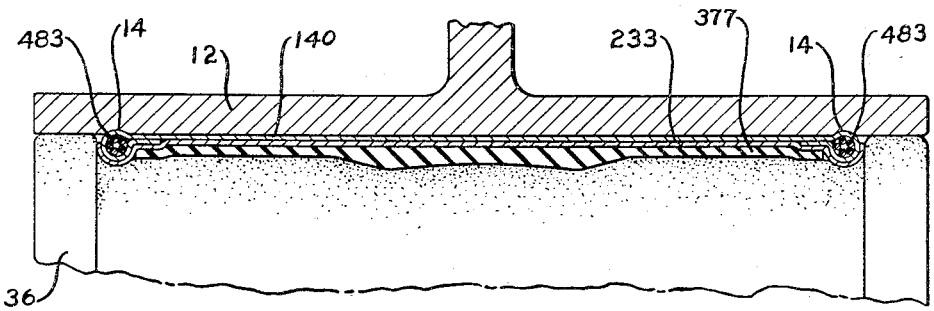

In addition to the stitching rollers 36 and 42, means is provided in association with the building drum 12 for turning the fabric plies around the bead wires, and for stitching them down in that relation. A pair of ply turn-over plows 45 and 46 (Figs. 5 and 7) are mounted on a pivot shaft 47, and are adapted to engage with the surface of the building drum 12. The operation of the plows is further illustrated in Fig. 24. In addition to the plows, turn-over wheels 48 and 49 attached to the plows 45 and 46, respectively, function to move the fabric around the bead wires as shown in Fig. 25. Stitching wheels 50 and 51, mounted on arms pivotally attached to the plows 45 and 46, respectively, in a manner to produce tension against the drum 12, stitch the fabric down after it is turned around the bead wires by the wheels 48 and 49, as more particularly shown in Fig. 26.

The turn-over plows (Figs. 5 and 7) and associated stitching wheels must be moved out of engagement with the building drum 12 in order that bead wires may be assembled on the drums, and to permit removal of the assembled carcass. This is effected by mounting the plows and associated stitching wheels on the shaft 47 which is pivotally supported by the frame 8. An arm 52 attached to the shaft 47 is pivotally attached to a connecting link 53 which engages with a cam arm 54. The cam arm 54 is pivotally supported at 55 to the frame 8 and engages with a cam 56. Cam shaft 57 to which the cam 56 is attached is driven from a gear 58, pinion 59, and shaft 60, to a source of power hereinafter described. As thus provided, the cam 56 operates the turn-over plows and associated mechanisms at proper intervals in the sequence of the tire building operation.

Figure 30:
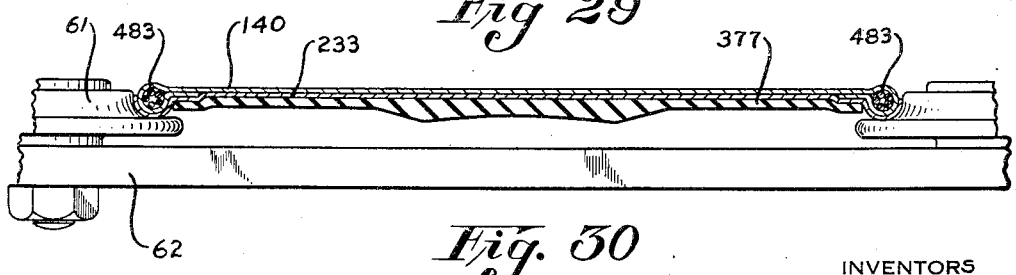

Additional guide stitcher wheels 61 mounted on a bracket 62 attached to the frame 8 assist in stitching the outer marginal portions of the fabric against the bead wires. This stitching mechanism is shown in Figs. 5 and 30.

In splicing treads when building pneumatic tires it is general practice to soften the end surface of the tread in order to make it more suitable for splicing. Automatic means is provided for accomplishing this function, including roller 63 (Fig. 5) adapted to contact the leading end of an applied tread. The roller 63 is rotatably mounted on a receptacle 64 containing a fluid such as gasoline or rubber cement. By this arrangement, the surface of the roller 63 is coated with a fluid for transmission to the leading end of the tread. The container 64 is attached to an arm 65 connected to a shaft 66 pivotally mounted on the frame 8. An additional arm 67 (Fig. 6) also attached to the shaft 66 joins with a connecting link 68 pivotally attached to a cam arm 69 mounted on the shaft 55. A cam 70 (Fig. 5) attached to the cam shaft 57 engages with the cam arm 69, resulting in movement of the rollers 63 toward the under side of the building drum 13 at that stage of the building operation when the end of the tread reaches the under side of the building drum 13.

At the end of each cycle of operation, timing mechanism, described hereinafter, functions through the solenoid 289 to operate the valve mechanism 23 to cut off the fluid pressure supply, thus causing the stitching rollers 36 and 42 to move out of engagement with the drums 12 and 13, respectively. The pneumatic cylinder 25, which is simultaneously actuated, causes the piston rod 27 to recede, carrying with it the pivoted arm 18 and building drum 13. This change of position of the building drum 13 removes tension on the bead wires which have been applied to the drums, and permits the tire carcass to be readily removed from the building drums. Movement of the pivoted arm 18 also operates to disengage the electric switch 28, with the result that power is cut off from the driven building drum 12 to permit removal of the tire carcass therefrom. When this operation is completed a subsequent set of bead wires is again placed on the building drums 12 and 13. The operator presses the foot pedal 20, and the mechanism continues in a similar cycle of operation.

*First ply feeding and cutting mechanism*

After the bead wires are applied to the building drums 12 and 13, a ply of fabric, referred to as the first ply, is assembled with the under side of the bead wire. The apparatus and means for feeding, measuring, cutting, and applying first ply fabric to the bead wires is illustrated in particular in Figs. 11, 12, 13, and 5.

A belt type conveyor 71 (Fig. 11) disposed transversely of and between the reaches of the building drums 12 and 13 provides means for feeding the first ply toward the building drums. The belt conveyor 71 is supported by transverse members 72 and 73 attached to the frame plates 8 and 9. The conveyor is driven from a shaft 74 which connects with power means and timing devices hereinafter described.

At the building drum end of the conveyor 71, and positioned thereover but between reaches of the building drums, a diagonally mounted cylinder 75 is located, the purpose of which is to transfer the first ply fabric from its transverse position on the conveyor 71 to a tangential position with respect to the building drums 12 and 13. The cylinder 75 is secured to a bracket 76 which in turn is attached to the main frame 8. In order to facilitate ease of movement of the first ply fabric around the diagonally disposed cylinder 75, a plurality of balls 77 are retained in the cylinder 75 in a manner to permit their projection partly out of the roller 75 and to have free, rotatable movement.

As the first ply fabric extends from the conveyor 71 around the cylinder 75 and toward the building drum 12, it is positioned between the plate 44 (Fig. 5) and the reaches of the bead wires. When an operator presses the foot pedal 20, the plate 44 is moved toward the under side of the bead wires, with the result that the first ply fabric lying therebetween is pressed into engagement with the bead wires. Due to the tacky condition of the bead wires and rubberized fabric, the first ply readily adheres to the bead wires and is carried along with same upon movement of the latter. To facilitate this operation, the plate 44 (Fig. 12) is provided with rollers 78.

When a sufficient length of first ply fabric has been applied to the building drums, the fabric is diagonally severed (Figs. 11 and 12). This operation is accomplished by a shear plate 79 which, at the proper time, moves into a position between the first ply fabric and the bead wires. The shear plate 79 is attached to a shaft 80 journaled in bearings 81 fastened to the frame 8. An arm 82, also attached to the shaft 80, couples with a connecting link 83 joining a pivoted cam arm 84 (Fig. 13). Cam arm 84 engages with a cam 85 attached to a shaft 86 journaled in bearings attached to the frame members 8 and 9. A sprocket 87 keyed to the shaft 86 engages with a chain 88 which in turn engages with means, hereinafter described, for driving the shaft 86 at proper intervals.

The cutting edge of the shear plate 79 (Fig. 12) is provided with a blade member 89. In cooperative assembly with the blade 89 is a cutting device which comprises a main pivoted arm 90 to which is attached a blade holder arm 91 and a blade member 92. The arm 91 is pivoted to the arm 90 at 93, and a spring 94 normally retains the arm 91 against a stop bolt 95 supported by the arm 90. By this arrangement, proper engagement of the blade members 89 and 92 is assured.

A shaft 96 forming a part of the arm 90 is pivotally mounted in a bracket 97 (Fig. 11) attached to the frame 8. At the opposite end of the shaft 96 is an arm 98 which is coupled to a vertical rod 99 (Fig. 13). The lower end of the rod 99 is pivotally connected to arm 100 keyed to a shaft 101 supported by bearings attached to the frame members 8 and 9. A dog 102 is also attached to the shaft 101. A latch arm 103 pivoted to the frame 8 at 104 includes means for engagement with the dog 102 for maintaining the vertical rod 99 in its upward position to hold the cutting mechanism normally in its inactive position. A spring 105 attached to the lower end of the vertical rod 99 and connected to the frame member 8 provides means for actuating the cutting mechanism upon disconnection of the latch arm 103 with the dog 102. The cutting mechanism as shown in Fig. 13 is in its operating or cutting position.

Means for resetting the cutting device and for causing the dog 102 to re-engage with the latch arm 103 is provided from the main cam shaft 57. This means includes an arm 106 coupled to a connecting link 107 pivotally attached to a cam arm 108. The cam arm 108 is pivoted to the shaft 55 and engages with the cam 109. The cam shaft 57 is driven in a manner to effect resetting the cutting device in the proper sequence of operation.

Actuation of the latch arm 103 away from the dog 102 is effected by a solenoid coil 110 energized by an electrical timing device hereinafter described. A pair of brackets 111 extending from the solenoid pivotally engage with an arm 112 keyed to a horizontal shaft 113 journaled in bearings indirectly fastened to the frame members 8 and 9. A miter gear 114 meshes with a miter gear 115 to which is attached a latch arm 116. The purpose of the latch arm 116 is to provide actuating means for engaging with a latch member 117 pivoted at 118 to the frame 8. A connecting link 119 joins the latch member 117 with the latch arm 103, and a spring 120 maintains engagement between the latch arm 103 and the dog 102. A bumper 121 limits the movement of the latch member 117.

Operation of the horizontal shaft 113 also has the function of controlling movement of the belt conveyor 71. The belt conveyor 71 is driven from the shaft 15 (Fig. 11) through a pair of spiral gears 123 and 124 to a conveyor drive shaft 125. The drive shaft 125 is in axial alignment with the conveyor shaft 74, and is indirectly connected therewith through a differential clutch mechanism 126. The differential clutch mechanism 126 is of the type illustrated in Fig. 17, and consists generally of a conventional device for permitting an axial drive therethrough, and for interrupting the through drive upon the release of a braking action associated therewith.

The braking action for the differential clutch mechanism 126 is controlled by movement of the horizontal shaft 113, the connecting means being an arm 127 (Fig. 11) and link 128. A brake mechanism 129 is mounted on the conveyor shaft 74, and is also operated from the horizontal shaft 113 through an arm 130 and link 131. The purpose of the horizontal shaft 113 is, therefore, to provide trip mechanism for the first ply fabric cutting device, to relieve the conveyor from its power driven means, and to apply a braking action for positive control of movement of the conveyor 71.

*First ply supply mechanism*

Means for supplying fabric to the first ply feeding mechanism is shown in particular in Figs. 8, 9, and 10. Essentially, it comprises means for supporting supply rolls, a splicing table, and a festoon mechanism.

A supply roll 132 (Fig. 8) including first ply fabric wound between convolutions of a liner, is mounted on a roll 133 rotatably supported by the frame 10. From the supply roll 132 the liner material extends around a drive roller 134 keyed to a shaft 135 mounted on bearings attached to the frame members 10 and 11. The drive roller 134 operates to wind the liner material to form a roll of liner 136 on a spindle 137. An arm 138 pivoted to the frame 10 at 139 supports the spindle 137. The first ply fabric stock 140 is withdrawn from the supply roll 132 and passed around driven rollers 141 and 142. A shaft 145, mounted in bearings supported by the frame members 10 and 11, is keyed to and drives the roller 142. The driven roller 141 is mounted on an arm 143 which is pivotally mounted on a shaft 144 supported by bearings attached to the frame members 10 and 11. The shaft 144 is driven, and a sprocket 146 is keyed to the shaft which joins with a sprocket 147 through a chain 148. Sprocket 147 is keyed to a shaft 149 to which roller 141 is secured. In this manner the roller 141 rotates continuously, and, due to the weight of the arm 143 and driving mechanism, is adapted for constant engagement with the periphery of the supply roll 132.

The fabric stock 140 passes around the roller 142 and over a roller 150 attached to the frame 10. A roller 151 mounted on a pivoted arm 152 supported by the frame member 10 contacts with the fabric stock lying on top of the roller 142. The object of this contact is to apply tension to the stock and to hold the stock in closer engagement with the drive roller 142. A roller 153 supported by an arm 154 pivotally attached to the frame member 10 at 155 engages with the stock 140 between the rollers 142 and 150. The arm 154 is held in the position as shown in Fig. 8 by tension of the stock 140 as it extends over the rollers 142 and 150. When the end of a roll of stock is reached, the tension in the stock in its position over rollers 142 and 150 is relieved, and the arm 154 is permitted to drop by its own weight, thus operating cam mechanism hereinafter described for stopping the fabric drive.

A splicing table 156 is mounted in a horizontal position, and is attached to the frame member 10. The object of the splicing table is to permit splicing of the trailing and leading margins of stock each time a supply roll becomes exhausted.

From the splicing table 156 the stock 140 moves around an idler roll 157 to a driven roll 158 mounted on a shaft 159 supported by bearings attached to the frame members 10 and 11. From the driven roll 158 the stock 140 is fed into a festoon mechanism, which, in general, comprises a plurality of upper rollers 160 mounted on a bracket 161 attached to the frame member 10, and a plurality of lower rollers 162 mounted on a bracket 163 adaptable for vertical movement by mechanism hereinafter described. A drive roller 164 mounted on a shaft 165 supported by bearings attached to the frame members 10 and 11 operates to withdraw the stock 140 from the festoon device and to position the stock in a free loop for reception by the stock feeding conveyor 71 (Fig. 1). Guide rollers 166 (Fig. 1) mounted on a frame 167 attached to the frame member 9 assist in locating the stock 140 on the conveyor 71.

The mechanism for driving the various rollers forming part of the first ply supply mechanism is shown in particular in Fig. 9. This view shows the operating mechanism which lies in back of the frame member 10 shown in Fig. 8.

In order that the festoon device will function properly, two separate drives are utilized, one for feeding the stock to the festoon and the other for removing stock from the festoon. The festoon feeding device is actuated by an electric motor 168 operating through a reduction unit 169 supported by structural members 170 attached to the frame members 10 and 11. A drive sprocket 171 extending from the reduction unit 169 meshes with a chain 172 and engages with a sprocket 173 attached to the main drive shaft 159 for feeding the fabric stock to the festoon device. The chain 172 also engages with a sprocket 174 attached to shaft 145 for driving the roller 142 (Fig. 8). An idler sprocket 175 completes the chain unit.

Also attached to the shaft 159 is a variable speed pulley 176 (Fig. 1) which, through a belt 177, connects with a pulley 178 keyed to a shaft 179 mounted in bearings supported by the frame members 10 and 11. The liner drive roller 134 (Fig. 8) mounted on shaft 135 is driven from the shaft 179 (Fig. 9) through gears 180 and 181. The shaft 144 which functions to drive the stripping roller 141 (Fig. 8) is driven from the shaft 179 (Fig. 9) through sprockets 182 and 183 and a chain 184. This construction provides suitable means for driving the fabric stock toward the festoon device.

The pivoted arm 154 (Fig. 8) for stopping the drive mechanism when tension on the fabric between rollers 142 and 143 is relieved operates, through the shaft 155, a cam 185 (Fig. 9). An electric switch 186 (Fig. 31) cooperates with cam 185 so that, when tension on the stock is relieved, as when approaching the end of a strip of stock, it will cut off the current to the motor 168 and thus stop feeding movement of the stock to the festoon device. The motor 168 may again be set into operation when the arm 154 is reset, or additional electrical equipment (not shown) may be interposed between the motor 168 and the switch 186, requiring manual operation of an additional switch for starting the motor.

Due to slippage of the drive rollers or stretching of the stock, it is desirable to vary the drive roller speeds. This differential in driving speeds is effected by adjusting the variable pulley 176 (Fig. 1). Adjustable means is provided in the form of a sprocket 187 (Fig. 9) in cooperative engagement with the variable speed pulley 176 mounted on the shaft 159. A chain 188 connects the sprocket 187 with a sprocket 189 keyed to a shaft 190. The shaft 190 is mounted in bearings supported by the frame members 10 and 11, and includes a hand operated wheel 191 (Fig. 8) for permitting manual adjustment of the variable speed pulley 176.

Keyed to the shaft 159 is a sprocket 192 (Fig. 1) which drives a sprocket 193 (Fig. 9) through a chain 194. Sprocket 193 is keyed to a short shaft 195 supported by a bracket 196 attached to the frame member 11. A sprocket 197 also attached to the shaft 195 meshes with a chain 198 which controls vertical movement of the carriage to which the lower festoon rollers are attached.

The bracket 163 (Fig. 8) to which the lower festoon rollers 162 are attached is secured to a carriage which, in general, comprises a shaft 199 (Fig. 10) attached to guide brackets 200 and 201. The front guide bracket 201 includes guide rollers 202 and 203 which cooperate with a vertical slide-way 204 in the frame member 10. A similar slide-way 205 in the bracket member 196 attached to the frame 11 cooperates with guide rollers 206 and 207 extending from the guide bracket 200. In order to maintain the shaft 199 in a horizontal position during vertical movement of the carriage, a pair of gears 208 and 209 are rotatably mounted on the shaft 199, but maintain an attached relationship by means of a tubular shaft 210. The gears 208 and 209 engage with racks 211 and 212 respectively, each rack being attached to the bracket member 196 and frame member 10, respectively. The guide bracket 200 rotatably supports an upper sprocket 213 and a lower sprocket 214.

As shown in Fig. 9, the chain 198 meshing with sprocket 197 extends around an idler sprocket 215, around the lower sprocket 214 mounted on the guide bracket 200, and meshes with another idler sprocket 216. From sprocket 216 the chain continues upwardly and meshes with a sprocket 217 mounted on a short shaft 218 extending from the bracket member 196. From the sprocket 217 the chain 198 continues downwardly and meshes with the upper sprocket 213 mounted on the guide bracket 200, thence returning to the original sprocket 197.

Also mounted on the short shaft 218 is a sprocket 219 which, through a chain 220, meshes with a sprocket 221 (Fig. 1) keyed to the shaft 165. Shaft 165 is driven from the conveyor 71 (Fig. 11) by means of a pulley 222 attached to the shaft 74. A belt 223 joins the pulley 222 with a variable speed pulley 224 (Fig. 1) mounted on the shaft 165. Means for adjusting the variable speed pulley is effected by a sprocket 225 associated with the pulley 224, chain 226, and sprocket 227. The latter sprocket is connected to a shaft 228 to which a hand wheel 229 is attached for manual operation of the variable speed pulley. By this method of providing a double drive for the festoon device it is permissible to feed the fabric stock into the festoon, regardless of whether or not stock is being withdrawn from the festoon.

When the lower set of rolls of the festoon device reach the end of their lower vertical movement, it is desirable to provide automatic means for stopping the entrance of fabric stock from the supply rolls to the festoon device. This is accomplished by providing an electric switch 230 (Fig. 9) attached to the frame member 11 at the lower end of the slot 205 formed by the bracket 196. A trip member 231 (Fig. 10) attached to the end of the horizontal shaft 199 is positioned for engagement with the electric switch 230. The connection between the switch and the trip member is such that the switch circuit is broken when the trip member engages the switch, and as the trip member moves upwardly away from the switch the switch circuit is closed. Electric wires as shown in Fig. 31 connect the switch 230 with the motor 168 for feeding the fabric stock to the festoon device.

An electric switch 232 (Fig. 9) located at the upper end of the slot 205 formed by the bracket 196 is also relatively positioned with the trip member 231 so that the circuit of switch 232 is broken upon engagement of the trip member 231 with the switch 232. The switch 232 is operated when the lower festoon rolls are carried to an elevated position due to lack of fabric stock in the festoon device. An electrical connection (not shown) between the switch 232 and the main source of power for driving the tire building apparatus functions to stop the entire mechanism when the circuit of switch 232 is broken.

In the operation of the apparatus, the switches 230 and 232 are not generally actuated. The mechanism for feeding the fabric stock to the festoon and the mechanism for withdrawing the stock from the festoon are controlled and timed to provide uniform flow of fabric stock from the supply rolls through the festoon device and to the tire assembly operation.

The feeding mechanism for supplying stock to the festoon device operates independently of the mechanism for withdrawing the stock from the festoon device. Therefore, the feeding mechanism generally maintains the festoon device with a full supply of fabric stock as illustrated in Fig. 8, and the switch 230 brings the feeding mechanism to rest when the festoon device carries a full supply of stock. There is a sufficient supply of stock in the festoon device to permit an operator to replenish the stock roll 132 and to splice the leading end of the stock to the trailing end of the preceding roll at the stock table 156, without interrupting the tire building operation.

*Second ply feeding and cutting mechanism*

The second ply feeding and cutting mechanism 4 is shown in particular in Figs. 2, 3, 14, 15, and 16. In general, this mechanism consists in cutting the second ply stock diagonally and advancing the leading end of the cut stock toward and into engagement with the tire building drum.

The second ply 233 (Fig. 14) extends from the second ply stock supply mechanism through the feeding and cutting mechanism to a horizontal position in tangential relation with the tire building assembly. The cutting mechanism is located adjacent to the tire building drum 13. In general, it comprises a cutter blade 234 and a shear bar 235 positioned on either side of the second ply 233 in diagonal relationship thereto, and adaptable for reciprocal, vertical movement to effect severance of the second ply stock 233 from a continuous stock supply. The cutter blade 234 is supported by a bracket 236 attached to vertically disposed rack members 237 and 238 (Fig. 15). The shear bar 235 is supported by a bracket 239 attached to complementary rack members 240 and 241. All of the rack members are supported by upper and lower brackets 242 and 243, respectively, attached to the frame member 8. In Fig. 14 it should be noted that the frame member 8 is omitted in order to illustrate the cooperative mechanism which lies in back of the frame member.

The rack members are supported by the lower bracket 243 (Figs. 14 and 15) through guide rollers 244 rotatably mounted on pins 245 attached to the bracket 243. In a similar manner, the rack members are supported from the upper bracket 242 (Fig. 14) by guide rollers 246 rotatably secured to the bracket 242. Central guide rollers 247 function as spacers at the upper portion of the rack members. The lower portions of the rack members 238 and 241 engage with a gear 248 keyed to a shaft 249 mounted in bearings supported by the frame members 8 and 9 and the bracket 243. Rack members 237 and 240 engage with a gear 250 also attached to the shaft 249. By this method of association of the elements, rotary movement of the shaft 249 functions to move the cutter blade 234 and shear bar 235 into and out of engagement for effecting severance of the second ply stock.

Actuation of the cutting operation is caused by activating a solenoid coil 251 (Fig. 14) by a timing means hereinafter described. A link 252 connects with the solenoid and with an arm 253 keyed to a shaft 254. As shown particularly in Fig. 16, the shaft 254 is mounted in bearings supported by the frame members 8 and 9.

A latch arm 255, also keyed to the shaft 254, engages a latch member 256 extending from an arm 257 pivoted to the frame member 8 at 258. A stop member 259 limits the movement of the arm 257, and a spring 260 maintains the arm 257 in its normal position against the stop member 259. A second latch 261 extending from the side of the arm 257 engages with a latch arm 262 (Fig. 16) keyed to the shaft 249. Also extending from the shaft 249 is an arm 263 to which is attached a spring 264 forming engagement at its opposite end to the frame 9.

When the circuit leading to solenoid 251 is broken, the link 252 moves upwardly, carrying with it the arm 253 which moves the shaft 254 about its center. Through the latch arm 255 the latch member 261 extending from the arm 257 is moved out of engagement with the latch arm 262. When this occurs, the shaft 249 is rotated about its center due to the action of the spring 264, thus causing rotary movement of the gears 248 and 250 (Fig. 15), and elevating rack members 240 and 241 and lowering rack members 237 and 238. As a result of the actuation of spring 264, the cutter blade 234 is brought into engagement with the shear bar 235 and the fabric 233 is severed. When the circuit leading to the solenoid is broken, the latch mechanism is actuated by a spring 265 (Fig. 14) which engages an arm 266 attached to the shaft 254.

After the fabric has been severed, the cutter blade 234 and shear bar 235 are brought back to their extended position through the operation of a cam 267 (Fig. 14) keyed to the cam shaft 57.

A rocker arm 268 mounted on the shaft 55 engages with the cam 267 and couples with a connecting link 269. An arm 270 (Fig. 17) keyed to the shaft 249 pivotally attaches to the connecting link 269. By this mechanism the cam 267, being properly timed, functions to rotate the shaft 249, thus separating the cutter blade 234 and shear bar 235 preparatory to a similar cycle of cutting operation.

After the cutting operation, and after the cutter blade 234 and shear bar 235 are in their upper and lower positions respectively, the leading end of a strip of the second ply fabric 233 is advanced toward the tire building drum 13 (Fig. 2). Directly above the drum 13 is a stitcher roll 42.

As the advancing means carries the fabric stock into engagement with the drum 13 the fabric is led to the bite of the drum and stitcher roll. The stock, being of a tacky nature, readily adheres to the already assembled tire components with the result that the advanced strip of second ply fabric is pulled from the supply mechanism by movement of the tire band around the building drums 12 and 13. Before reaching the advancing means the second ply fabric passes over and under a plurality of guide rolls 271 (Fig. 16). A bracket 272 connects the guide rolls with the frame member 8.

In order to prevent stretching of the stock as it is pulled on to the tire assembly, a free loop of stock at 273 (Fig. 2) is permitted to accumulate between the guide rolls 271 and the means for withdrawing the stock from the festoon device forming a part of the second ply fabric supply mechanism.

Means for advancing the second ply fabric toward the building drum comprises, in general, a horizontal fabric support 274 (Fig. 14) pivotally retained by a double pair of parallel arms 275 and 276. The arms 275 and 276 are attached to shafts 277 and 278, respectively, mounted in bearings attached to the frame member 8. Attached to the shaft 278 is an arm 279 supporting a roller 280 which engages with a cam 281 keyed to a shaft 282. An additional arm 283 also keyed to the shaft 278 engages with a spring 284 connecting the frame member 8, for the purpose of maintaining the roller 280 against the cam 281 and for maintaining the fabric advancing means normally in receded position.

The horizontal fabric supporting member 274 includes a plurality of rollers 285 against which the fabric may pass over and under, as shown in Fig. 14. An additional roller 286 operating in a vertical slot in the horizontal member 274 rests upon one of the rollers 285 for the purpose of applying a slight amount of tension to the fabric, and for preventing the fabric from moving backward after the cutting operation. The horizontal member 274 also includes a table 287 (Fig. 16) upon which the end of the fabric ply may rest.

A sprocket 288 keyed to the shaft 282 meshes with the chain 88, which in turn engages a sprocket 290 keyed to the cam shaft 87. By this timing arrangement the fabric advancing means cooperates with the cutting mechanism for advancing each strip of cut material to the building drum 13, and thereafter recedes to its normal position out of the way of the cutter blade 234 and shear bar 235. As the cutting blade is actuated by a spring, actual severance of the fabric is accomplished with sufficient rapidity to avoid the necessity of stopping the flow of fabric during the cutting operation. Any irregularity, such as lack of an instantaneous severing operation, is overcome by the fabric itself because of its capability of stretching without impairment to the assembled tire.

Second ply supply mechanism

As shown in Fig. 2, the second ply supply mechanism comprises stock rolls and a festoon device substantially similar to that described in detail with reference to the first ply supply mechanism. Briefly, the arrangement consists of a second ply supply roll 291 rotatably supported by the frame 8. From the supply roll 291 the liner material wound between convolutions of the stock extends around a drive roller 292 which operates to wind the liner material to form a roll of liner 293. An arm 294 pivoted to the frame 8 supports the liner roll 293. A stripping roll 295 separates the stock 233 from the liner material, after which the stock passes around a drive roll 296, over a splicing table 297 extending from the frame member 8, around an idler roll 298, and over a drive roll 299 for feeding the stock into a festoon device. A weighted roll 300 mounted on an arm 301 supported by the frame member 8 applies tension to the stock 233 and facilitates the driving action of the drive roll 296. An arm 302, having a roller resting on the fabric 233 between the drive roll 296 and an idler roll 303, is keyed to a shaft 304 extending through the frame member 8, and cooperates with means for cutting off the source of power for driving the stock rolls in the event tension on the arm 302 is relieved due to the approach of the end of the fabric from the supply roll.

The festoon device consists of a bracket 305, fixed to the frame member 8, which supports a plurality of rollers 306. In complementary relation with these rollers is a plurality of lower festoon rollers 307 mounted on a vertically movable bracket 308 operated by a mechanism hereinafter described. A drive roller 309, mounted on a shaft 310 supported by bearings attached to the frame members 8 and 9, functions to withdraw the fabric stock 233 from the festoon device and to position the stock in a free loop 273 in receptive position for the fabric feeding and cutting mechanism.

Driving mechanism for the supply device described above is shown in particular in Fig. 4. For a plan view of the driving mechanism of the second ply supply device, reference may be had to Fig. 1 which shows a plan view of the mechanism for driving the tread supply device; and, as both driving devices are identical, the reference numerals may be considered interchangeable. A motor 311, through a reduction unit 312, drives a sprocket 313 which, through a chain 314, drives sprockets 315 and 316 mounted on shafts 317 and 318, respectively. Shaft 318 connects with the drive roller 296 (Fig. 2). The liner drive roller 292 attaches to a gear 319 (Fig. 4) meshing with a gear 320 keyed to shaft 321. The roller 295 (Fig. 2) extending from a pivoted arm 322 has a drive passing through sprockets 323 and 324 and chain 325. Sprocket 324 is connected to a sprocket 326 (Fig. 4), and a chain 327 joins the sprocket 326 with a sprocket 328 keyed to the drive shaft 321. A pulley 329 (Fig. 1) also keyed to the shaft 321 is driven from the shaft 317 through a belt 330 and variable speed pulley 331. The latter pulley is adjustable by means of a hand operated control 332 which communicates to the variable speed pulley 331 through sprockets 333 and 334 and a chain 335. A sprocket 336, also keyed to the shaft 317, drives the festoon device through a chain 337 and sprocket 338 connected to a festoon sprocket 339. A chain 340 meshing with the latter sprocket passes around sprockets 341, 342, 343, 344, and 345 in a manner to cause a carriage to which the bracket 307 (Fig. 2) is attached to move along a vertical path, depending upon the amount of stock present in the festoon device. Gears 346 attached to a shaft which supports the festoon bracket 307 meshes with racks 347 for maintaining the festoon bracket 308 in a horizontal position during its vertical movement.

When the movable unit of the festoon device is in its lower position it engages with an electric switch 348 (Fig. 4) and breaks an electric circuit between the switch and the motor 311. This action stops feeding of the fabric stock into the festoon device when a sufficient supply of the stock is supported by the festoon. When the fabric stock is almost completely exhausted from the festoon device, the elevating portion of the festoon reaches its uppermost position and engages with an electric switch 349, thereby breaking the circuit of the main drive and stopping the complete apparatus until additional stock is fed into the festoon.

Figure 4:
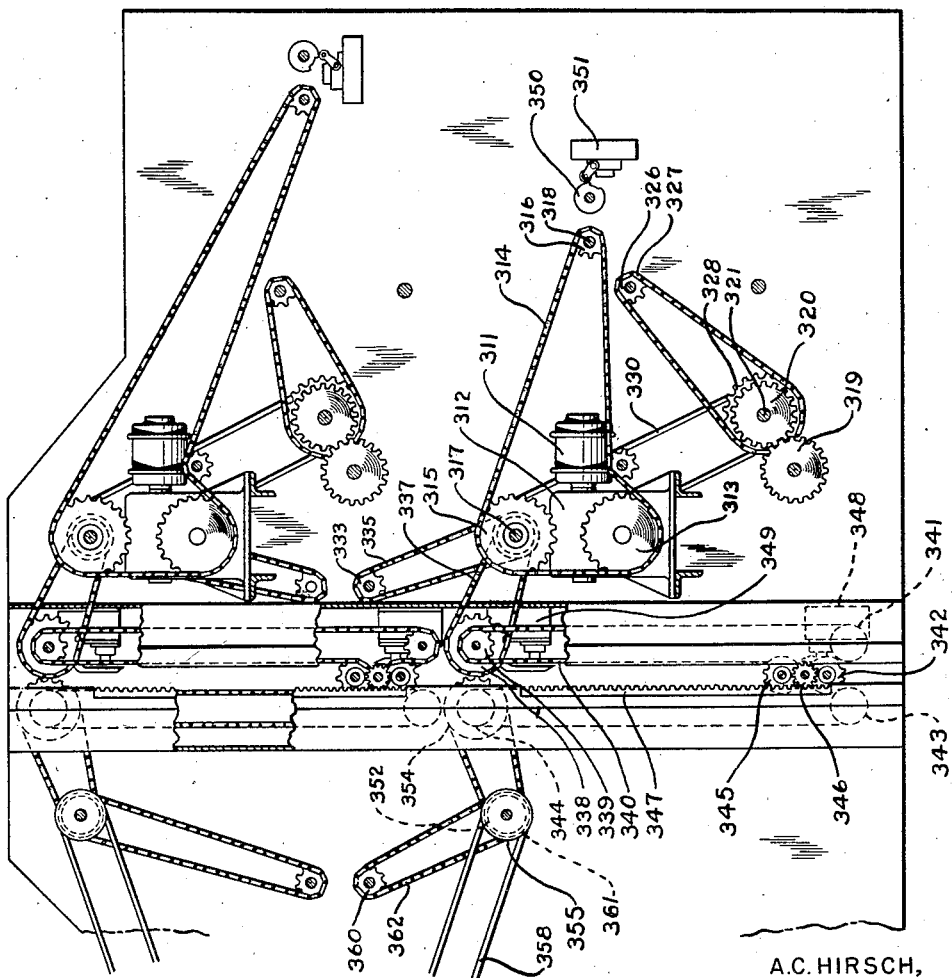
Fig. 4 is a continuation of the view shown in Fig. 3, taken along line IV—IV of Fig. 1.

When the end of a strip of stock from the supply roll is reached, the motor 311 is stopped automatically by a downward movement of the arm 302 (Fig. 2) due to release of tension in the fabric stock between the rolls 296 and 303. The arm 302 is attached to the shaft 304 which extends through the frame member 8 and is keyed to a cam 350 (Fig. 4). The cam 350 engages with an electric switch 351 for breaking the circuit leading to the motor 311 when the arm 302 is in a lower position.

The drive roll 309 (Fig. 2) keyed to the shaft 310 is the principal means for withdrawing the fabric stock from the festoon device. A sprocket 352 (Fig. 1) meshing with a chain 353 connects with a sprocket 354 which, in turn, is attached to the sprocket 344 forming a part of the festoon elevating mechanism. Through this connection a separate drive means is employed for withdrawing the fabric stock from the festoon, as distinguished from the drive means for supplying the stock to the festoon. A variable speed pulley 355 attached to the shaft 310 is connected to a pulley 356 keyed to a drive shaft 357 (Fig. 16) through a belt 358. The variable speed pulley 355 (Fig. 1) may be adjusted by a hand operated control 359 mounted on the frame member 8 and connected to a sprocket 360 joining a sprocket 361 attached to the shaft 310 by means of a chain 362.

Figure 3:
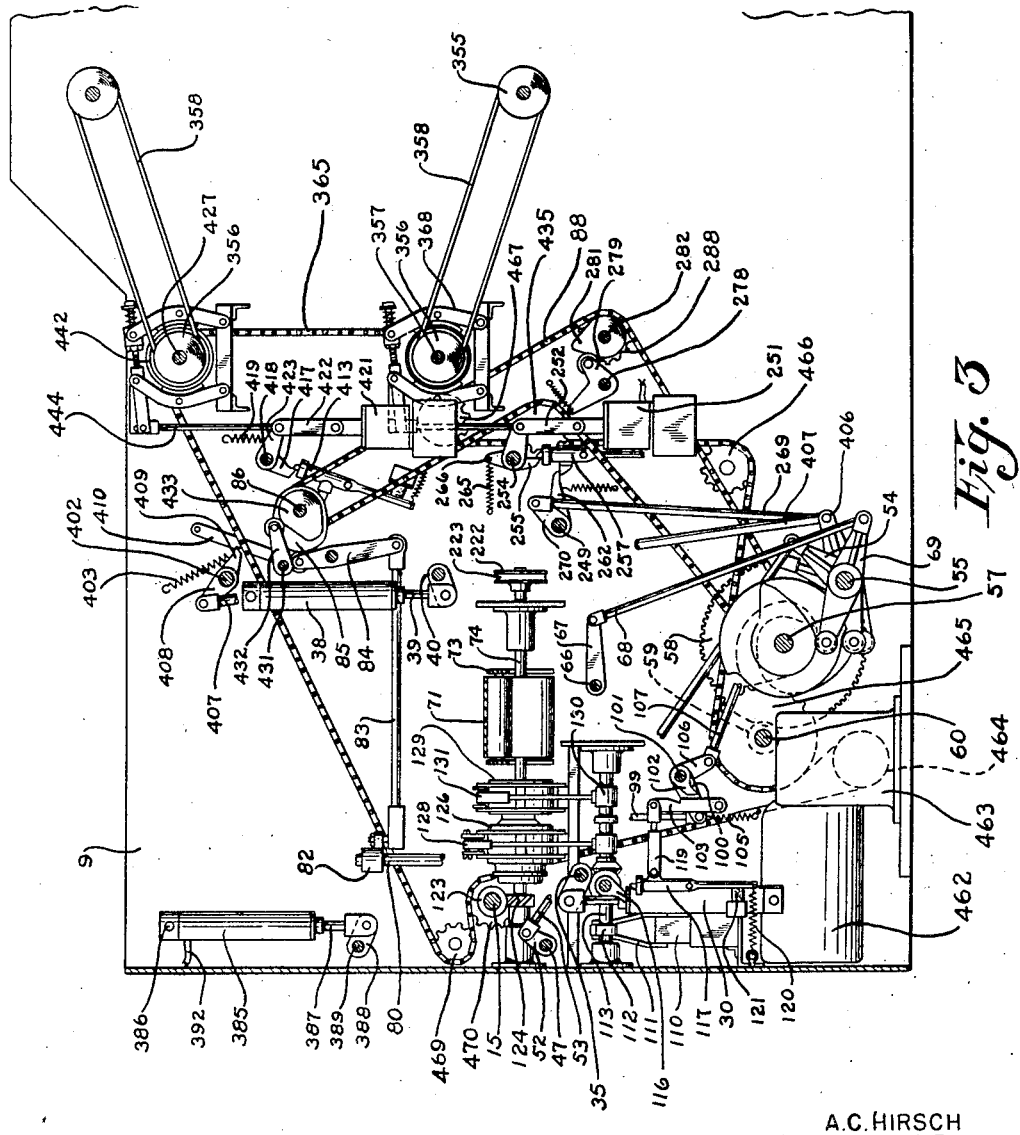
Fig. 3 is an enlarged elevational view, in section, of a portion of the mechanism in back of the frame shown in Fig. 2, this section being taken along line III—III of Fig. 1.

The drive shaft 357 (Fig. 16) is in axial alignment with shaft 363, the ends of each of which are mounted in bearings supported by frame members 8 or 9. The shaft 363 is driven from a sprocket 364 keyed thereto which communicates to the principal power drive through a chain 365 (Fig. 3).

A differential clutch mechanism 366 (Fig. 16) of conventional type attached to shafts 357 and 363 forms an indirect drive from the shaft 363 to the shaft 357, as shown more particularly in Fig. 17. The differential clutch mechanism is of a conventional planetary gear type, which in ordinary use functions as a direct drive from shaft 363 to shaft 357. However, upon the release of a brake mechanism 367, motion of the shaft 357 is arrested while the shaft 363 continues to rotate. An independent brake mechanism 368 operating on the shaft 357 stops any movement of the shaft 357 due to momentum or frictional engagement of its associated connections. Both the differential clutch mechanism 366 and the brake mechanism 368 are controlled by activation of the solenoid coil 251 (Fig. 14). Arms 369 and 370 (Fig. 16) attached to the shaft 254 engage with connecting links 371 and 372, respectively, which in turn connect with the differential clutch mechanism and the brake mechanism, respectively. At the proper cycle of operation the shaft 254 (Fig. 14) is motivated by the solenoid coil, thus operating the differential clutch mechanism and brake mechanism simultaneously.

As thus operated, the drive shaft 357 is rotated intermittently in a manner to drive the rollers 309 (Fig. 2) for withdrawing fabric stock from the festoon device, at such time and in such quantity as to permit a definite amount of second ply fabric to extend in a free loop at 273, and in accordance with the quantity of stock required at a cycle of the tire building operation.

*Tread feeding and cutting mechanism*

The tread feeding and cutting mechanism 6 is shown in particular in Fig. 2, and in detail in Figs. 18, 19 and 20. The purpose of this mechanism is to apply a strip of tread stock to the assembled plies on the tire building supports at the proper time in the tire building operation, and to cut the tread to proper length. As in conventional practice, the cutting of the tread stock is performed in a manner to bevel the ends of the strip of stock in order to facilitate splicing.

The tread stock is fed toward the tire building supports by means of a pair of belt type conveyors 373 and 374 (Fig. 18). These conveyors are supported by a pair of brackets 375 pivotally mounted to the frame 8 at 376. The conveyors 373 and 374 are positioned in such manner that one of the belt reaches of one conveyor is in adjacent relation with one of the belt reaches of the other conveyor. A strip of tread stock 377 is brought into engagement with the conveyors 373 and 374, and between the reaches thereof, with the result that the tread stock 377 is gripped between the belt reaches and is carried along upon movement of the conveyors.

Each of the belt conveyors is driven. The conveyor 373 is driven from the tire building support 12 by frictional engagement with the conveyor belt passing around a driven roller 378. A pair of gears 379 and 380 mounted on the bracket 375 transmit motion from the roller 378 to a sprocket 381. A chain 382 meshing with the sprocket 381 engages with a sprocket 383 (Fig. 20) attached to a roller 384 (Fig. 18) which drives the conveyor 374. By this method of driving the conveyors 373 and 374, the adjacent reaches of the conveyor belts of the respective conveyors are moved to the same direction.

The conveyor roller 378, through the conveyor belt, is in constant engagement with the tire building support 12, or to the tire elements supplied thereto throughout the tire building operation. As a result of this engagement, a frictional drive of the conveyors 373 and 374 is attained, and in addition the roller 378 functions as a stitcher to press the various tire elements together in compact relation.

When a completely assembled tire carcass is removed from the tire building supports 12 and 13, and when a set of bead wires are assembled with the tire building supports, the bracket 375 upon which the conveyors 373 and 374 are mounted is moved out of engagement with the tire building supports. This is accomplished by a pneumatic cylinder 385 pivoted at 386 to the frame member 8 and having a piston rod 387 which is engageable with an arm 388 attached to a shaft 389 mounted in a bearing supported by the frame member 8. An arm 390, also keyed to the shaft 389, connects with a link member 391 pivotally attached to the bracket 375. The cylinder 385, therefore, functions to move the conveyors 373 and 374 into or out of engagement with the tire building supports by causing the bracket 375 to swing about its pivot 376.

A conduit 392 connects the cylinder 385 to a valve 23 (Fig. 5) which controls other cylinders for cooperating on the tire building supports. A spring, not shown, within the cylinder 385 elevates the bracket 375 from engagement with the tire building supports when fluid pressure is relieved within the cylinder 385. Means for releasing fluid pressure within the cylinder 385 will be described hereinafter.

In the proper cycle of operation the tread stock 377 is moved by the conveyors 373 and 374 into engagement with previously assembled tire components on the tire building supports, and the conveyor roller 378 provides the initial pressure for pressing the tread stock 377 into engagement with the assembled tire elements.

Means for cutting the tread stock 377 is located near the pivotal end of the conveyor bracket 375 (Fig. 18). The cutting device comprises knife blades 393 and 394 mounted on either side of the tread 377, and in a diagonal position relative to the tread, thus forming beveled ends on the tread to facilitate splicing. The knife blade 393 is mounted on a pair of rack members 395, and the knife blade 394 is mounted on a pair of rack members 396. Each of the rack members is supported by upper and lower brackets 397 and 398 fastened to the frame member 8. Rollers 399 rotatably secured to the lower bracket 398 separate the opposing rack members 395 and 396, and gears 401 keyed to a shaft 402 supported by the bracket 397 and frame members 8 and 9 mesh with the rack members 395 and 396 to cause reciprocal movement of the knife blades 393 and 394 upon rotary movement of the shaft 402.

The cutting blades are actuated by a spring 403 upon release of latch members for holding the knife blades in their separated position. The spring 403 is supported at one end from the frame member 9, and its opposite end is connected to an arm 404 (Fig. 20) keyed to the shaft 402. After the cutting operation, caused by action of the spring 403, the knife blades are brought back to their receded position by operation of a cam 405 (Fig. 18) mounted on the cam shaft 57. A double cam arm 406 pivoted to the shaft 55 engages with the cam 405 and attaches to a connecting link 407 which joins with an arm 408 keyed to the shaft 402. Also keyed to the shaft 402 is a latch 409 adapted for cooperable engagement with a latch member 410 pivotally attached to the frame member 9 at 411. The opposite end of the latch member 410 connects with a link 412 extending from a double arm lever 413 pivoted to the frame member 9 at 414. The lever 413 is held in its normal position, as illustrated in Fig. 18, by a spring 415 attached to the lever and the frame member 9 to hold the lever 413 against a cushion stop member 416.

Movement of the lever 413 from its normal position results in disengagement of the latch 409 with the latch member 410, thereby causing the severance of the tread 377 by action of the spring 403. The lever 413 is actuated through its engagement with a latch arm 417 keyed to a shaft 418 mounted in bearings supported by the frame members 8 and 9. A spring 419, connected at one end to the frame member 9 and at the other end to an arm 420 keyed to the shaft 418, provides a force for actuating the latch members and releasing the knife blades 393 and 394.

To reset the latch members, a solenoid 421 is provided which connects the shaft 418 through a connecting link 422 and arm 423 keyed to the shaft 418. When the solenoid 421 is energized, the various latch members are moved in a position for maintaining the knife blades 393 and 394 in their receded positions. However, when the current leading to the solenoid 421 is cut off, by timing means hereinafter described, the spring 419 causes rotary movement of the shaft 418, thus releasing the latch mechanisms and permitting the knife blades to descend upon the tread stock.

A secondary belt type conveyor 424 (Fig. 18) supported by the frame member 8 is positioned in alignment with the belt conveyors 373 and 374 and supports the tread 377 as it is moved toward the cutting mechanism. Pressure rollers 425 engaging with the secondary conveyor 424 maintain the tread stock in proper frictional engagement with the conveyor belt of the secondary conveyor. A pulley 426 keyed to a shaft 427 mounted in bearings supported by the frame member 8 provides a drive for the belt of the conveyor 424.

After each tread cutting operation, means is provided for guiding the leading end of a subsequent strip of tread stock into engagement with the belt conveyors 373 and 374. This guiding device is shown in particular in Fig. 19. Essentially, it comprises a bracket 428 supporting a plurality of rollers 429 adaptable to engage the under side of the tread 377 for supporting and guiding the tread to a position between the conveyors 373 and 374. The bracket 428 is attached to an arm 430 keyed to a shaft 431 mounted in bearings supported by the frame 8. A cam arm 432, also keyed to the shaft 431, engages through a roller with a cam 433 keyed to the shaft 86. A spring 434 having one end attached to the frame 8 maintains the cam arm 432 and its associated roller in contact engagement with the cam 433. The cam 433 provides a timing arrangement whereby the bracket 428 and rollers 429 are moved out of the path of the knife blades 393 and 394 during the cutting operation, but are brought back into supporting position relative to the tread 377 upon receding movement of the knife blades 393 and 394.

The cam 433 is driven by the shaft 86 through sprocket 87 and chain 88 which passes around sprocket 288 (Fig. 14) and meshes with sprocket 290 keyed to the cam shaft 57. An idler sprocket 435 (Fig. 3) maintains the chain 88 in position out of interference with other mechanism.

The secondary conveyor 424 (Fig. 2) is driven intermittently in proper sequence with the tire building operation by the pulley 426 which is coupled with the stock supply mechanism 7 and timed in a manner to provide a free loop of tread stock 377 at 436.

Preceding the secondary conveyor 424 is a bracket 437 supporting a plurality of rollers 438 adapted to guide the tread 377 in proper position and tension relative to the secondary conveyor 424. The conveyor pulley 426 is keyed to the shaft 427, which in turn is driven from main drive chain 365 (Fig. 3) meshing with a sprocket 439 (Fig. 20) keyed to a shaft 440 in axial alignment with the shaft 427. A conventional differential clutch mechanism 441 forms an indirect drive from the shaft 440 to the shaft 427. A braking mechanism 442 attached to the shaft 427 is cooperable with the differential clutch mechanism 441 for effecting its proper operation. Reference may be had to Fig. 17 which illustrates a similar application of a differential clutch and brake mechanism.

When the clutch mechanism 441 (Fig. 20) is actuated, and the brake mechanism 442 is in released position, the effect is a direct drive from the shaft 440 to the shaft 427. However, when a reverse condition takes place, that is, the brake of differential clutch mechanism 441 is disengaged and the brake 442 is applied, the shaft 427 is stopped from rotating and the shaft 440 continues its normal rotation.

Means for actuating the differential clutch and brake mechanism is provided by the solenoid 421 (Fig. 18) which simultaneously operates the latch mechanisms for controlling the tread cutting operation. The solenoid 421 subjects the shaft 418 (Fig. 20) to a rotary motion, and an arm 443 keyed to the shaft 418 joins with a connecting link 444 attached to the brake mechanism 442. In a similar manner, an arm 445, through a connecting link 446, engages with the differential clutch mechanism 441. Operation of the differential clutch and brake mechanisms is such that the solenoid in a one direction movement will engage the brake 442 and release the clutch mechanism 441, or will engage the clutch mechanism 441 and release the brake mechanism 442.

*Tread supply mechanism*

The tread supply mechanism 7 in function is identical to the second ply supply mechanism 5. Therefore, it is believed unnecessary to describe the tread supply mechanism in detail, as reference may be had to the second ply supply mechanism for a complete description of its details and operation.

Briefly, the tread supply mechanism, as shown on the front of the frame member 8 of Fig. 2, comprises a tread stock supply roll 447 from which a liner is withdrawn by a drive roller 448 and wound up to form a roll 449 on a spindle extending from an arm 450 pivotally attached to the frame member 8. A drive roller 451 supported by an arm 452 pivotally attached to the frame 8 operates as an initial drive for removing the tread strip 377 from the stock roll 447. From the stock roll 447 the tread moves around a drive roller 453 to a horizontal position where a pivoted control arm 454 engages the tread for the purpose of cutting off the circuit to the drive for feeding the festoon device when the end of a supply roll is reached. The tread stock moves over a splicing table 455 and around a drive roller 456 for feeding the stock to the festoon device. A plurality of rolls 457 extending from a bracket 458 attached to the frame 8, and a plurality of rolls 459 extending from a vertically movable bracket 460 constitute the principal elements of the festoon device. A drive roller 461 operates to withdraw the tread stock from the festoon device to maintain a supply of stock in a free loop at 436 in receptive position for the tread feeding and cutting mechanism 6.

Drive

The principal drive for the tire building mechanism is shown in Fig. 3. It comprises a motor 462 operating through a reduction unit 463 for driving a sprocket 464. Chain 365 meshes with the sprocket 464 and drives a sprocket 465 keyed to the intermediate drive shaft 60 mounted in bearings supported by the frame members 8 and 9. Pinion 59 keyed to the shaft 60 meshes with the gear 58 keyed to the cam shaft 57. From the sprocket 465 the chain 365 meshes with idler sprockets 466 and 467, and from the latter idler sprocket the chain meshes with the sprocket 364 (Fig. 16) keyed to the shaft 363. From this sprocket the chain extends upwardly and engages with the sprocket 439 (Fig. 20) keyed to the shaft 440. In continuing its driving operation, the chain 365 extends around an idler sprocket 469 (Fig. 3) and engages a sprocket 470 keyed to the shaft 15. Chain 365 then returns to its original driving sprocket 464.

The single chain 365, therefore, functions to drive the cam shaft 57, the second ply feeding and cutting mechanism 4, the tread feeding and cutting mechanism 6, the tire building drum 12, the first ply supply conveyor 71, and the electrical timing device shown in Fig. 21.

Timing device

In order to provide means for forming electrical connections to operate the various solenoids forming part of the mechanism, an electrical, cam operated timing device of conventional type is utilized. This device is shown in particular in Fig. 21. A housing 471 is attached to the frame member 9, and has a timing shaft 472 mounted in bearings forming a part of the housing. The shaft 472 is driven from the shaft 15 through gears 473 and 474. A plurality of cams 475, 476, 477, and 478 are keyed to the shaft 472 and are adaptable for operating contact switches 479, 480, 481 and 482, respectively. Cam shaft 472 rotates continuously throughout the tire building operation. At the proper cycle of operation the cam 475 engages the switch 479 forming a circuit to the solenoid 110, the actuation of which, through intermediate mechanism, drives the conveyor 71 for advancing the first ply and for feeding same to the tire building drums. The electrical connections extending from the contact switches 479, 480, 481, and 482 are illustrated diagrammatically as shown in Fig. 32.

When the proper length of first ply fabric is applied to the building drums, the solenoid 110, through the timing device, is de-energized. This movement operates latch mechanism shown in Fig. 13, resulting in severance of the first ply through a spring action. At the same time, the mechanism for feeding the first ply stock toward the building drum is stopped.

In a somewhat similar manner the cam 476 functions to complete a circuit to the solenoid 251 (Fig. 14) which operates to advance the second ply stock toward the building drum. When the solenoid 251 is de-energized, by breaking the circuit through operation of the cam 476, latch mechanism is tripped, whereupon the second ply is severed by a spring action and the feeding mechanism preceding the cutting device ceases to operate.

The cam 477 controls operation of the tread feeding and cutting mechanism shown in Fig. 18. When the cam 477 completes a circuit with the solenoid 421, feeding mechanism is set into operation for advancing the tread toward the building drums. When the solenoid is de-energized, through operation of the timing device, latch mechanism is tripped, the tread is severed by the tread cutting mechanism, and the feeding mechanism for supplying the continuing stock is stopped.

The last cam 478 operates to stop the main drive at the end of a complete cycle of operation. This is effected by a circuit leading to the magnetic coil 289 (Fig. 5) associated with the air valve 23. The result of energizing the coil 289 is to actuate the valve 23 for causing recession of the piston rods in cylinders 25, 30, 38 and 385. This movement simultaneously removes all the stitching devices associated with the tire building drums, and swings the drum 13 on its pivot 19 for facilitating removal of a completely assembled tire band. As the tire building drum 13 is moved on its pivotal support, it disengages a switch 28 which stops the main power drive. The timing device and associated cams are so designed that upon completion of a cycle of operation, a subsequent cycle may be started by the operator by merely pressing the foot pedal 20.

Operation

Figure 22:
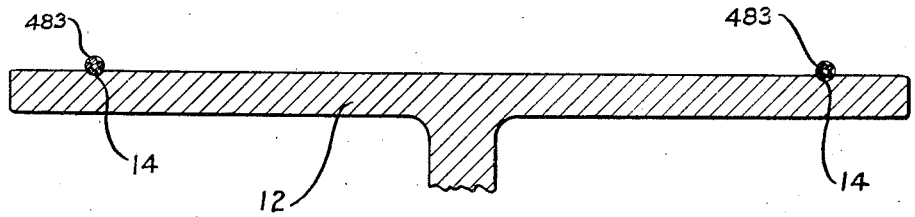

At the beginning of operation of the tire building apparatus, the mechanism is in its inoperative position; that is, building drum 13 is in its collapsed location in receptive position for application of bead wires 483 (Fig. 22). All of the stitching and ply feeding mechanisms are removed from engagement with the tire building drums to avoid interference with the application of bead wires. The bead wires are manually placed on the drums by the operator, and are located in spaced relation in grooves 14 in the tire building drum.

When the bead wires are properly positioned, the operator presses the foot pedal 20 for starting the tire building operation. Through movement of the foot pedal, the valve 23 is actuated and the stitching rollers 36 and 42 are simultaneously brought into engagement with the building drums 12 and 13, respectively. At the same time, the tread conveyor is brought into engagement with the building drum 12. Actuation of the valve 23 causes the building drum 13 to move away from the building drum 12, thereby applying tension to the bead wires 483. When the tire building drum 13 reaches its outward movement, an electric switch 28 is actuated for causing operation of the main drive. The tire building drums are rotated continuously throughout the tire building operation.

The normal position of the first ply 140 is such that it rests substantially in tangential relation with the building drum 12 and within the reaches of the bead wires. Operation of the foot pedal 20 causes the first ply to be pressed against the under side of the bead wires. Due to the tacky nature of the ply stock and the bead wires, the first ply readily adheres to the bead wires and is carried along with the wires upon movement of the tire building drums. When a length of ply substantially equal to the circumferential length of the bead wires is partially applied to the drums, the first ply cutting mechanism is brought into operation for severing the fabric stock.

Figure 23:
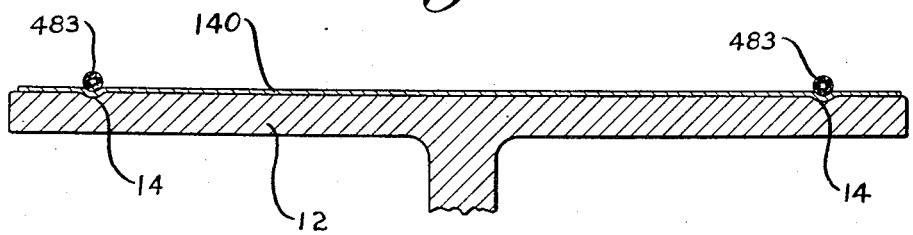
Figure 24:
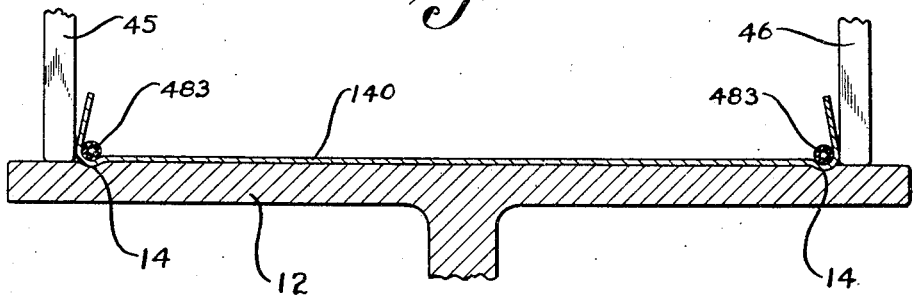

As shown in Fig. 23, the first ply stock 140 is positioned between the bead wires and the building drum. Before the ply 140 is brought into engagement with the building drum, a pair of plows 45 and 46 (Fig. 24) are moved into position against the tire building drum 12 by cam means hereinbefore described. The purpose of the plows 45 and 46 is to turn the marginal edges of the ply 140 up and partially around the bead wires 483.

The stitching rollers 48 and 49 (Fig. 25) attached to the plows 45 and 46, respectively, engage with the marginal edges of the ply 140 for turning the edges of the ply still further around the bead wires 483. Stitching rollers 50 and 51 (Fig. 26), also connected to the plows, press the marginal edges of the fabric around the bead wires and into engagement with the body of the ply. A resilient stitcher 36 (Fig. 27) underneath the drum 12, and a resilient stitcher 42 above the drum 13 complete the stitching operation of the first ply in its relation with the bead wires.

Means for applying the second ply 233 (Fig. 28) is actuated at about the same time the first ply is severed. The second ply engages the tire assembly at a point between the tire building drum 13 and the stitcher 42. Before the second ply reaches the proximity of the building drum 12, the plows 45 and 46 and their associated stitching devices are moved out of engagement with the building drum 12. The resilient stitching rollers 36 and 42 press the second ply into engagement with the first ply, and the stitching wheels 61 insure that the marginal edges of the second ply are firmly adhered with the underlying ply. When a proper length of second ply fabric has been applied to the tire assembly, the second ply cutting mechanism is moved into operation for severing the fabric.

Application of the tread 377 is initiated before the second ply is completely applied to the tire building assembly. The tread is applied to the tire band at a point above the building drum 12. The roller 378 for driving the tread applying conveyor functions to press the tread firmly against the previously applied tire components. When a length of tread equal to the circumferential length of the tire band has been started in the tire assembly, the cutting mechanism is set into operation to cut or skive the tread. The tread cutting device operates to form a bevel at the ends of the tread to facilitate splicing. This is in accordance with conventional practice.

When the tread is partially applied to the assembly, the leading end thereof is treated in order to increase its adhesive characteristics to facilitate splicing. An adhesive or solvent applicator roll 63 (Fig. 5) operable by cam actuated means, engages the leading end of a tread as it moves around with the tire band assembly.

The tread and underlying plies are stitched in compact assembly by the stitching rollers 36 (Fig. 29) and 42 which remain in engagement with the tire band assembly throughout the tire building operation. The stitching roller 61 (Fig. 30) also remains in engagement with the ply stock throughout the tire building operation.

When the second ply is applied to the tire band assembly, it is engaged with the assembly at about the same time the first ply is severed from the continuous length of first ply stock. The leading edge of the tread engages with the tire assembly at any time after the leading edge of the second ply passes the point of application for the tread. In actual practice, it has been found that the first and second plies and the tread may be conveniently applied in a distance less than 2¾ times the circumferential movement of the tire band.

When all of the tire components are applied and stitched in proper assembly, tension on the tire band is relieved by moving the drum 13 in closer relation with the building drum 12, rotation of the drum is stopped, the stitchers which engage the tire assembly are removed therefrom, and the completed tire assembly removed from the drums by the operator. After the tire is removed from the drums, the apparatus is in condition for starting a similar cycle of operation.

Throughout the tire building operation the ply and tread supply mechanisms and their associated festoon devices permit a continuous flow of stock to the tire building assembly, and as the stock rolls are exhausted a full roll may be substituted for the empty roll, and the ends of the material may be spliced without interrupting the flow of stock from the festoon device. The apparatus, therefore, provides a continuous source from which stock may be withdrawn and concentrated at building supports where the various stocks are automatically cut to proper length and assembled to form a pneumatic tire band.

While we have shown and described a preferred embodiment of our invention, it is to be understood that it is subject to modifications as to the specific mechanism disclosed, to the cycle of application of the different tire components, and to the number of plies which form the tire band, and it is contemplated to include such modifications in so far as they relate to the scope of the appended claims.

Having thus described our invention, what we claim and desire to protect by Letters Patent is:

1. The method of building a tire band which comprises arranging a pair of bead wires in spaced relation on a pair of spaced pulleys, rotating the pulleys, moving a fabric ply from a position substantially transverse of the reaches of the pulleys to a position parallel with the reaches of the pulleys, applying the fabric ply to the under side of the bead wires, and cutting the fabric to proper length after the leading end of one fabric is applied to the bead wires and without stopping rotation of the pulleys until the tire band is assembled.

2. The method of building a tire band which comprises arranging a pair of bead wires in spaced relation on a pair of spaced pulleys, rotating the pulleys, moving a fabric ply from a position substantially transverse of the reaches of the pulleys to a position parallel with the reaches of the pulleys, applying the fabric ply to the under side of the bead wires from a path within the reaches of the pulleys, and cutting the fabric to proper length after it is partially applied to the bead wires and at a location within the reaches of the pulleys and without stopping rotation of the pulleys until the tire band is assembled.

3. The method of building a tire band which comprises arranging a pair of bead wires in spaced relation on a pair of spaced pulleys, rotating the pulleys, moving a fabric ply from a position substantially transverse of the reaches of the pulleys to a position parallel with the reaches of the pulleys, applying the fabric ply to the under side of the bead wires, cutting the fabric to proper length after the leading end of the fabric is applied to the bead wires and without stopping rotation of the pulleys until the tire band is assembled, and applying the leading end of an additional fabric ply to the pulleys and on top of the bead wires before the first layer of fabric completely circumscribes the pulleys.

4. The method of building a tire band which comprises arranging a pair of bead wires in spaced relation on a pair of spaced pulleys, rotating the pulleys, moving a fabric ply from a position substantially transverse of the reaches of the pulleys to a position parallel with the reaches of the pulleys, applying the fabric ply to the under side of the bead wires, cutting the fabric to proper length after the leading end of the fabric is applied to the bead wires and without stopping rotation of the pulleys until the tire band is assembled, applying the leading end of an additional fabric ply to the pulleys and on top of the bead wires before the first layer of fabric completely circumscribes the pulleys, and cutting the additional ply to proper length after the leading end of said ply is applied to the top of the bead wires and without stopping rotation of the pulleys.

5. The method of building a tire band which comprises arranging a pair of bead wires in spaced relation on a pair of spaced pulleys, rotating the pulleys, moving a fabric ply from a position substantially transverse of the reaches of the pulleys to a position parallel with the reaches of the pulleys, applying the fabric ply to the under side of the bead wires, cutting the fabric to proper length after the leading end of the fabric is applied to the bead wires and without stopping rotation of the pulleys until the tire band is assembled, applying the leading end of an additional fabric ply to the pulleys and on top of the bead wires before the first layer of fabric completely circumscribes the pulleys, and cutting the additional ply to proper length after the leading end of said ply is applied to the top of the bead wires and without stopping rotation of the pulleys, all of said plies being cut automatically upon a predetermined movement of the fabric around the pulleys.

6. The method of building a tire band which comprises arranging a pair of bead wires in spaced relation on a pair of spaced pulleys, rotating the pulleys, moving a fabric ply from a position substantially transverse of the reaches of the pulleys to a position parallel with the reaches of the pulleys, applying the fabric ply to the under side of the bead wires, cutting the fabric to proper length after the leading end of the fabric is applied to the bead wires and without stopping rotation of the pulleys until the tire band is assembled, applying the leading end of an additional fabric ply to the pulleys and on top of the bead wires before the first layer of fabric completely circumscribes the pulleys, and applying the leading end of a tread to the assembled plies before the preceding ply completely circumscribes the pulleys.

7. The method of building a tire band which comprises arranging a pair of bead wires in spaced relation on a pair of spaced pulleys, rotating the pulleys, moving a fabric ply from a position substantially transverse of the reaches of the pulleys to a position parallel with the reaches of the pulleys, applying the fabric ply to the under side of the bead wires, cutting the fabric to proper length after the leading end of the fabric is applied to the bead wires and without stopping rotation of the pulleys until the tire band is assembled, applying the leading end of an additional fabric ply to the pulleys and on top of the bead wires before the first layer of fabric completely circumscribes the pulleys, applying the leading end of a tread to the assembled plies before the preceding ply completely circumscribes the pulleys, and cutting the tread to proper length after it is partially applied to the assembled plies and without stopping rotation of the pulleys.

8. The method of building a tire band which comprises arranging a pair of bead wires in spaced relation on a pair of spaced pulleys, rotating the pulleys, moving a fabric ply from a position substantially transverse of the reaches of the pulleys to a position parallel with the reaches of the pulleys, applying the fabric ply to the under side of the bead wires, cutting the fabric to proper length after the leading end of the fabric is applied to the bead wires and without stopping rotation of the pulleys, applying the leading end of an additional fabric ply to the pulleys and on top of the bead wires before the first layer of fabric completely circumscribes the pulleys, applying the leading end of a tread to the assembled plies before the preceding ply completely circumscribes the pulleys, and cutting the tread to proper length after it is partially applied to the assembled plies and without stopping rotation of the pulleys, said plies and tread being cut automatically upon a predetermined movement of the fabric around the pulleys.

9. The method of building a tire band which comprises arranging a pair of bead wires in spaced relation on a pair of spaced pulleys, rotating the pulleys, moving a fabric ply from a position substantially transverse of the reaches of the pulleys to a position parallel with the reaches of the pulleys, applying the fabric ply to the under side of the bead wires, cutting the fabric to proper length after the leading end of the fabric is applied to the bead wires and without stopping rotation of the pulleys, and providing a continuous supply of fabric in a free loop for application to the bead wires.

10. The method of building a tire band which comprises arranging a pair of bead wires in spaced relation on a pair of spaced pulleys, rotating the pulleys, moving a fabric ply from a position substantially transverse of the reaches of the pulleys to a position parallel with the reaches of the pulleys, applying the fabric ply to the under side of the bead wires, cutting the fabric to proper length after the leading end of the fabric is applied to the bead wires and without stopping rotation of the pulleys, applying the leading end of an additional fabric ply to the pulleys and on top of the bead wires before the first layer of fabric completely circumscribes the pulleys, applying the leading end of a tread to the assembled plies before the preceding ply completely circumscribes the pulleys, and providing a continuous supply of stock in a free loop from which the fabric plies and the tread may be withdrawn to assemble the tire band.

ALF C. HIRSCH.
JULIEN F. CULLEN.
ARNOLD R. KRAUSE.
HOWARD O. HUTCHENS.